(12) United States Patent
Hidaka

(10) Patent No.: US 7,558,058 B2
(45) Date of Patent: Jul. 7, 2009

(54) EJECTOR, UNIT AND ELECTRONIC APPARATUS HAVING THE SAME

(75) Inventor: Hiroshi Hidaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 464 days.

(21) Appl. No.: 11/193,464

(22) Filed: Aug. 1, 2005

(65) Prior Publication Data

US 2006/0028805 A1 Feb. 9, 2006

Related U.S. Application Data

(63) Continuation-in-part of application No. 10/999,317, filed on Nov. 30, 2004, now abandoned.

(30) Foreign Application Priority Data

| Aug. 4, 2004 | (JP) | .............................. 2004-227856 |
| Mar. 16, 2005 | (JP) | .............................. 2005-074976 |
| Jun. 23, 2005 | (JP) | .............................. 2005-182996 |

(51) Int. Cl.
*H05K 7/12* (2006.01)

(52) U.S. Cl. ........................ 361/685; 361/732; 361/754

(58) Field of Classification Search ................. 361/685, 361/732; 312/223.2

See application file for complete search history.

(56) References Cited

U.S. PATENT DOCUMENTS 5,740,012 A * 4/1998 Choi .......................... 361/686
6,587,350 B1 * 7/2003 Lin et al. .................... 361/754
7,019,965 B2 * 3/2006 Bradley et al. .............. 361/685

FOREIGN PATENT DOCUMENTS

| JP | 6-84338 | 3/1994 |
| JP | 8-137631 | 5/1996 |
| JP | 8-151831 | 6/1996 |
| JP | 10-228750 | 8/1998 |
| JP | 11-327805 | 11/1999 |
| JP | 2000-122815 | 4/2000 |
| JP | 2000-149522 | 5/2000 |

OTHER PUBLICATIONS

Japanese Patent Office Action, mailed May 15, 2007 and issued in corresponding Japanese Patent Application No. 2005-182996.

* cited by examiner

*Primary Examiner*—Lisa Lea-Edmonds
*Assistant Examiner*—Ingrid Wright
(74) *Attorney, Agent, or Firm*—Staas & Halsey LLP

(57) ABSTRACT

An ejector that attaches a unit to and ejects the unit from an electronic apparatus, the unit including a unit body and a case that covers the unit body includes a lever that is attached foldably and unfoldably to the case, a force being applicable to the lever to attach the unit to and eject the unit from the electronic apparatus, and an engagement member that is movable along a surface of the case between a lock position at which the engagement member is engaged with is engaged with the lever folded onto the case and locks the lever at a folding position, and an unlock position at which the engagement member unlocks the lever and allows the lever to unfold from the case.

18 Claims, 31 Drawing Sheets

PRIOR ART

PRIOR ART

PRIOR ART

PRIOR ART

PRIOR ART          PRIOR ART

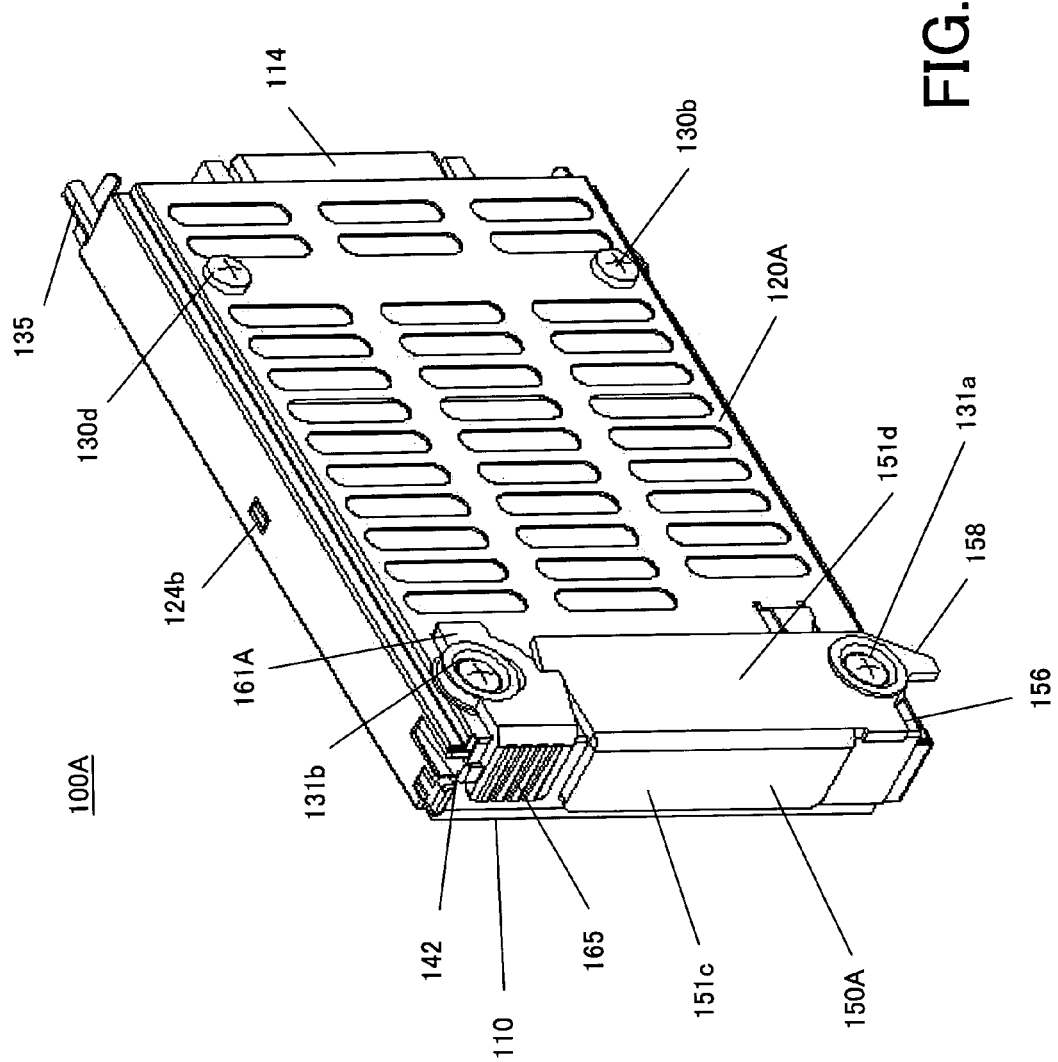

EJECTOR, UNIT AND ELECTRONIC APPARATUS HAVING THE SAME

This is a continuation-in-part of prior U.S. application Ser. No. 10/999,317, filed Nov. 30, 2004, now abandoned, to which the benefit is claimed under 35 U.S.C. § 120.

This application claims the right of a foreign priority based on Japanese Patent Application Nos. 2004-227856 filed on Aug. 4, 2004, 2005-74976 filed on Mar. 16, 2005, and 2005-182996 filed on Jun. 23, 2005, each of which is hereby incorporated by reference herein in its entirety as if fully set forth herein.

BACKGROUND OF THE INVENTION

The present invention relates generally to a unit and an electronic apparatus to which the unit is removably attached, and an ejector mechanism that loads the unit into and ejects the unit from the electronic apparatus. The present invention is suitable, for example, for a disc array storage that removably installs plural hard disc drive ("HDD") units.

The disc array storage that removably installs one or more HDD units has been recently proposed as a fast, large-capacity and highly reliable external storage (see for example, Japanese Patent Application, Publication No. 2004-54967). The disc array storage allows only a HDD unit that requires maintenance, to be exchanged while keeping a running state of the entire apparatus, and also includes a fixing mechanism that prevents unintentional ejections of the HDD unit(s) from the disc array storage due to vibrations.

FIG. 12 shows a conventional exemplary disc array storage 10 and HDD unit 20 attachable to it. Here, FIG. 12 is a schematic perspective view of the disc array storage 10 and the HDD unit 20. The HDD unit 20 includes, as shown in FIG. 13, a 3.5-inch HDD 30 that has a built-in 3.5-inch disc, and a case 40 that protects the 3.5-inch HDD 30. Here, FIG. 13 is an exploded perspective view of the HDD unit 20.

The 3.5-inch HDD 30 has, as shown in FIGS. 14A and 14B, a width W1, a length L1 and a height H1, which are, for example, 25.4 mm, 147 mm and 101.6 mm, respectively. Here, FIGS. 14A and 14B are front and side views of the 3.5-inch HDD 30.

The case 40 includes, as shown in FIGS. 12 and 13, an ejector mechanism 42 used to insert the 3.5-inch HDD 30 into and eject the 3.5-inch HDD 30 from the disc array storage 10, and a body 44. The ejector mechanism 42 unfolds as shown in FIG. 12 and folds as shown in FIG. 13; the ejector mechanism 42 includes a compression spring (not shown). The ejector mechanism 42 unfolds as shown in FIG. 12, when an eject button (not shown) is pressed to release the engagement by the compression spring while the ejector mechanism 42 is in the state shown in FIG. 13. Thereafter, a user pulls out the HDD unit 20 from the disc array storage 10 by pulling out the ejection mechanism 42. A reverse action is conducted in order to insert the HDD unit 20 into the disc array storage 10.

The case 40 has, as shown in FIGS. 15A and 15B, a width W2, a length L2 and a height H2, which are, for example, 27.1 mm, 204 mm and 112 mm, respectively. Here, FIGS. 15A and 15B are front and side views of the HDD case 40.

Other prior art include Japanese Patent Applications, Publication Nos. 11-260048, 8-19124, 8-137631, 11-327805, 6-84338, and 2000-122815.

Recent demands for smaller and lower-profile electronic apparatuses promote studies of an application of a 2.5-inch HDD instead of the 3.5-inch HDD for the next generation of disc array storage 10. In addition, as an amount of available information through the Internet etc. increases, a larger-capacity storage is required. Therefore, the disc array storage 10 is requested to install more HDD units 20. Accordingly, the instant inventor has attempted to achieve a smaller HDD unit 20 than the mere application of the 2.5-inch HDD instead of the 3.5-inch HDD. As a result, the instant inventor has discovered that the conventional ejector mechanism 42's length L3, which is about 57 mm, prevents the miniaturization demand.

BRIEF SUMMARY OF THE INVENTION

Accordingly, it is an exemplary object to provide a smaller ejector that attaches the unit to and ejects the unit from the electronic apparatus, the unit having this ejector, and the electronic apparatus that removably accommodates the unit.

An ejector according to one aspect of the present invention that attaches a unit to and ejects the unit from an electronic apparatus, the unit including a unit body and a case that covers the unit body includes a lever that is attached foldably and unfoldably to the case, a force being applicable to the lever to attach the unit to and eject the unit from the electronic apparatus, and an engagement member that is movable along a surface of the case between a lock position at which the engagement member is engaged with is engaged with the lever folded onto the case and locks the lever at a folding position, and an unlock position at which the engagement member unlocks the lever and allows the lever to unfold from the case. In the prior art example shown in FIGS. 12 to 15B, a direction in which the eject button (not shown) is pressed (or the moving direction of the eject button) is perpendicular to the front surface of the case 40, and the case becomes large by the moving distance. On the other hand, the inventive ejector enables the engagement member to move along the case surface, and does not enlarge the case. In addition, in the prior art example, the engagement member is part of the case and the lever is engaged with the case. On the other hand, in the inventive ejector, the engagement member is a separate member from the case and the lever is engaged with the engagement member rather than the case. Therefore, the inventive ejector has a higher degree of freedom of the arrangement between the engagement member and the lever, and can select such an arrangement between the engagement member and the lever that the case can be maintained small.

The unit is, for example, a storage, such as a HDD unit, and other electronic apparatus units. The electronic apparatus is, for example, a disc array storage, and plural electronic apparatuses may be housed in the cascade manner, for example, in a rack mount method.

The engagement member may be an elastically deformable arm that is movable between the lock position and the unlock position. In this ejector, the arm is elastically deformable and self-propelled. Therefore, this ejector needs no components, such as a spring, and reduces the number of components, achieving the miniaturization. This arm is made, for example, of resin.

The ejector may further include a forcing member that is at least partially located between the unit body and the case, and forces the engagement member at the lock position. When a space between the unit body and the case uses a space in which a light guide tube that displays a connection and disconnection between the unit body and the electronic apparatus, the unit does not become large since it utilizes the inherent space. This forcing member is, for example, a flat spring.

The lever may be commonly fixed onto the case by a fixing member that fixes the case onto the unit body, wherein the lever may be configured to be foldable and unfoldable around the fixing member relative to the case, and wherein the engagement member may include a first fixed member that is commonly fixed by the fixing member onto the case, a second fixed member that is non-movably commonly fixed by the fixing member onto the case, a support member that connects the first and second fixed members to each other, and is so elastically deformable that the support member applies an elastic force used to reset to the lock position, the first fixed member that has moved to the unlock position, an engagement member that is engaged with the lever when the second fixed member is located at the lock position, and disengaged from the lever when the second fixed member is located at the unlock position, and a forcing member that is elastically deformable, and applies a force in an unfolding direction of the lever while the forcing member is engaged with the lever.

An ejector according to another aspect of the present invention that attaches a unit to and ejects the unit from an electronic apparatus, the unit including a unit body and a case that covers the unit body includes a lever that is commonly fixed onto the case of the unit by a fixing member that fixes the case onto the unit body, wherein the lever is configured to be foldable and unfoldable around the fixing member relative to the case, a force being applicable to the lever to attach the unit to and eject the unit from the electronic apparatus. According to this ejector, the lever can fold and unfold (or rotate) around the fixing member, such as a screw, and thus the ejector is smaller than the prior art that provides a folding and unfolding mechanism as a separate member.

An ejector according to still another aspect of the present invention that attaches a unit to and ejects the unit from an electronic apparatus, the unit including a unit body and a case that covers the unit body includes a lever that is fixed foldably and unfoldably onto the case, a force being applicable to the lever to attach the unit to and eject the unit from the electronic apparatus, and an engagement member that is commonly fixed onto the case by a fixing member that fixes the case with the unit body the engagement member being movable between a lock position at which the engagement member is engaged with is engaged with the lever folded onto the case and locks the lever at a folding position, and an unlock position at which the engagement member unlocks the lever and allows the lever to unfold from the case. According to this ejector, the engagement member can move or displace around the fixing member, such as a screw, and thus the ejector is smaller than the prior art that provides a drive mechanism as a separate member.

The lever has, for example, a L-shaped section. When the lever is L-shaped, the lever can be engaged with the unit or the case on its side surface rather than its front surface. As a result, the unit or the case has a simple structure on the front surface, and the length of the unit or the case can be reduced. The L shape enables a user to hold a lever portion that corresponds to the unit's front surface and to apply a force to insert the unit into or eject the unit from the electronic apparatus. It is not preferable that the user holds a lever portion that corresponds to the unit's side surface and applies an unsymmetrical force to the unit through the lever portion. The engagement member has, for example, a L-shaped section, thereby improving the operability by restricting unnecessary rotations of the engagement member around the case.

The case may have first and second surfaces which are orthogonal to each other, wherein the engagement member may have a third surface parallel to the first surface, and a fourth surface parallel to the second surface, the first and third surfaces being orthogonal to a direction in which the unit is inserted into and ejected from the electronic apparatus, and wherein the ejector may further include a forcing member that forces the engagement member to the lock position via the third surface, and the fourth surface is commonly fixed onto the second surface by the fixing member. The movement of the engagement member becomes more stable when the engagement member is forced at the lock position via the fourth surface than when the engagement member is forced at the lock position via the third surface.

The ejector may further include a first forcing member that forces the engagement member to the lock position, and a second forcing member that forces the lever in a unfolding direction, a force by the first forcing member being preferably greater than a force by the second forcing member, because the reverse force relationship may possibly cause a disengagement between the engagement member and the lever.

The case may have a perforation hole in a surface perpendicular to a direction in which the unit is inserted into and ejected from the electronic apparatus, wherein the ejector may further include an elastically deformable forcing member that is fixed onto the case so that the forcing member can project from and retreat into the perforation hole, and forces the lever in an unfolding direction of the lever. Since the forcing member can retreat into the perforation hole, the case can be maintained small in the direction in which the unit is inserted into and ejected from the electronic apparatus.

A direction in which the engagement member moves from the lock position to the unlock position may be substantially orthogonal to a direction in which the unit is attached to and ejected from the electronic apparatus. Since it is unnecessary to maintain the space for the engagement member to move in a direction in which the unit is inserted into and ejected from the electronic apparatus or the longitudinal direction of the unit, the length of the unit or the case can be shortened. The engagement member may have a serration to which the force is applied while the engagement member moves from the lock position to the unlock position. The serration facilitates an engagement between the arm and the user's finger that moves on the arm, and improves the operability. In addition, the serration has a simpler structure than the eject button, and makes the ejector small.

The lever may include a tab that is engageable with the electronic apparatus and fixes the unit onto the electronic apparatus when the lever is located at the folding position. This configuration can prevent unintentional ejections or electronic disconnections of the unit from the electronic apparatus due to vibrations, etc. Preferably, the lever includes a connection release member engageable with the electronic apparatus, and releases an electric connection between the unit and the electronic apparatus. The lever's unfolding action serves as an electronic disconnection action between the unit and electronic apparatus, improving the operability. The ejector may further include a limiter, provided on the case, which contacts the lever and limits a further unfolding of the lever when the lever is located at an unfolded position, thereby preventing unnecessary rotations of the lever and improving the operability.

A unit that includes the above ejector and an electronic apparatus that can removably accommodate plural units each of which includes the above ejector also constitute one aspect of the present invention.

In particular, it is preferable that the unit is inserted into and ejected from the electronic apparatus in the height direction of the electronic apparatus. Since the length of the unit should match the height of the electronic apparatus, the reduced length of the unit is effective. When the unit is the HDD unit and the electronic apparatus is the disc array storage of a rack mount type, the height of the conventional disc array storage for the 3.5-inch HDD unit is 3U (=about 134 mm). Therefore, if the length of the 2.5-inch HDD unit is made within 3U, the design freedom increases without greatly changing the designs of external size of the disc array storage and the rack mount apparatus that mounts the disc array storages, because the unit can be inserted into the disc array storage in its longitudinal direction or in its height direction. In other word, it is preferable that the unit is a 2.5-inch hard disc drive unit, and the electronic apparatus has a height of about 3U (1U=44.45 mm).

The electronic apparatus may be a disc array storage that removably accommodates plural units arranged in a matrix along a height direction of the electronic apparatus, and includes a back panel that is arranged perpendicular to the height direction, the back panel relaying power to be supplied to each unit and data to be stored in each unit. An arrangement of the back panel perpendicular to the height direction facilitates installations of plural units. A direction in which the unit is inserted into and ejected from the back panel is usually perpendicular to the surface of the back panel. Therefore, in the configuration, like the prior art configuration, which inserts the unit and ejects the unit along the longitudinal direction of the disc array storage, the back panel obstructs an installation of the unit in the second or subsequent rows from the front row, and makes the arrangement of plural rows of units difficult. In addition, this configuration requires plural back panels. On the other hand, when the back panel is arranged perpendicular to the height direction of the disc array storage and the top of the disc array storage is made open, the units in a matrix can be arranged on one back panel and the number of back panels reduces and the capacity increases.

The electronic apparatus may further include a mounting frame fixed to the back panel, the mounting frame guiding a connection of the unit to the back panel, and accommodating each unit connected to the back panel. The mounting frame facilitates the insertion of each unit into and ejection of each unit from the back panel. In addition, the mounting frame accommodates and holds each unit, and prevents displacements of each unit due to vibrations etc. and damages of connection parts between each unit and the back panel.

The electronic apparatus may further include a power supply unit that supplies the power, a relay board that is mounted on the back panel in the height direction and connected to the power supply unit in a longitudinal direction of the disc array storage perpendicular to the height direction, and an interface unit that is connected to the back panel and used to transmit and receive the data. By making the connecting direction between the back panel and the relay board orthogonal to the connecting direction between the relay board and the power supply unit, the power supply unit can be arranged adjacent to the back panel along the longitudinal direction of the disc array storage. Since the Electronics Industries Association ("EIA") standard defines the width of the disc array storage, like a 19-inch cabinet, it is preferable to arrange the back panel and the power supply unit in the unrestricted longitudinal direction.

The electronic apparatus may further include an interface unit that is connected to the back panel and used to transmit and receive the data, wherein the interface unit may include first and second interface units, and wherein the first interface unit may be mounted on the back panel in the height direction, and the second interface unit may be connected to the first interface unit in a longitudinal direction of the disc array storage perpendicular to the height direction. Thereby, the first interface unit is attached to the back panel from the top of the disc array storage, and the second interface is attached to the first interface unit from the back of the disc array storage. Since the interface unit often extends throughout the overall length of the disc array storage in its longitudinal direction, this configuration is preferable in order to connect the interface unit to the back panel along the height direction of the disc array storage.

The electronic apparatus may further include a cooling fan unit that is mounted on the back panel in the height direction, is supplied with the power through the back panel, and cools the plural unit through air blow. Even when the mounting density of the units increases, this configuration prevents thermal damages of these units due to their increasing heating values.

The electronic apparatus may further include a display unit that is mounted on the back panel in the height direction, is supplied with the power via the back panel, and displays a state of the unit and/or the disc array storage. The display unit may include, for example, four types of lamps that notify normal and abnormal states of the operations of the unit and disc array storage.

The electronic apparatus may be a rack mount apparatus that can accommodate plural disc array storages in a height direction of the disc array storage, each of which removably accommodates plural units arranged in a matrix along the height direction, and comprises a back panel that arranged perpendicular to the height direction, the back panel relays power to be supplied to each unit and data to be stored in each unit. Each disc array storage may be accommodated in the rack mount apparatus so that each disc array storage can be drawn from the rack mount apparatus. Thereby, the insertion and ejection of the unit become easy.

Other objects and further features of the present invention will become readily apparent from the following description of the preferred embodiments with reference to accompanying drawings.

BRIEF DESCRIPTION OF THE DRAWINGS

FIG. 16 is a perspective overview of an HDD unit according to another embodiment of the present invention.

DETAILED DESCRIPTION OF THE PREFERRED EMBODIMENTS

Figure 1:
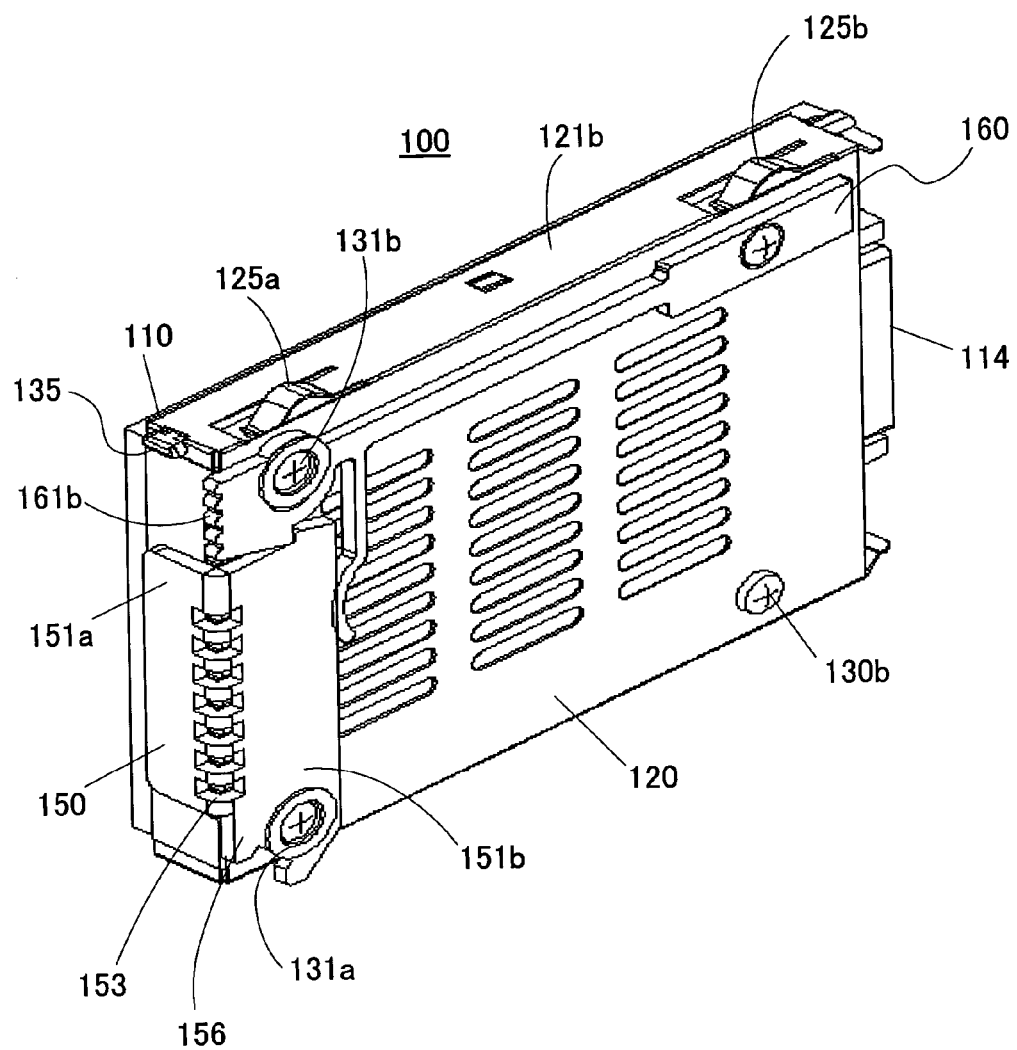
FIG. 1 is a perspective overview of a HDD unit according to one embodiment of the present invention.
Figure 2:
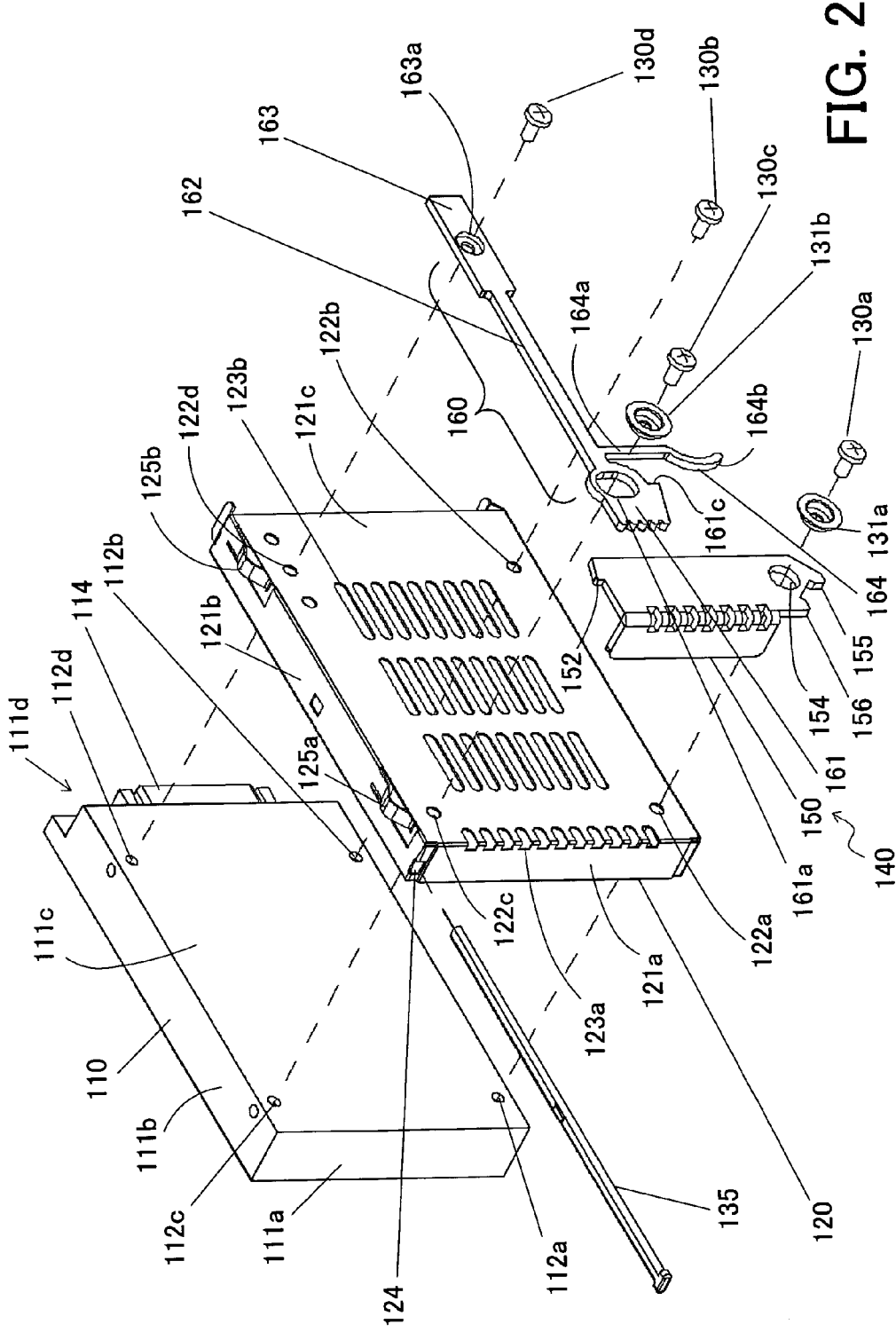
FIG. 2 is an exploded perspective view of the HDD unit shown in FIG. 1.
Figures 3A, 3B:
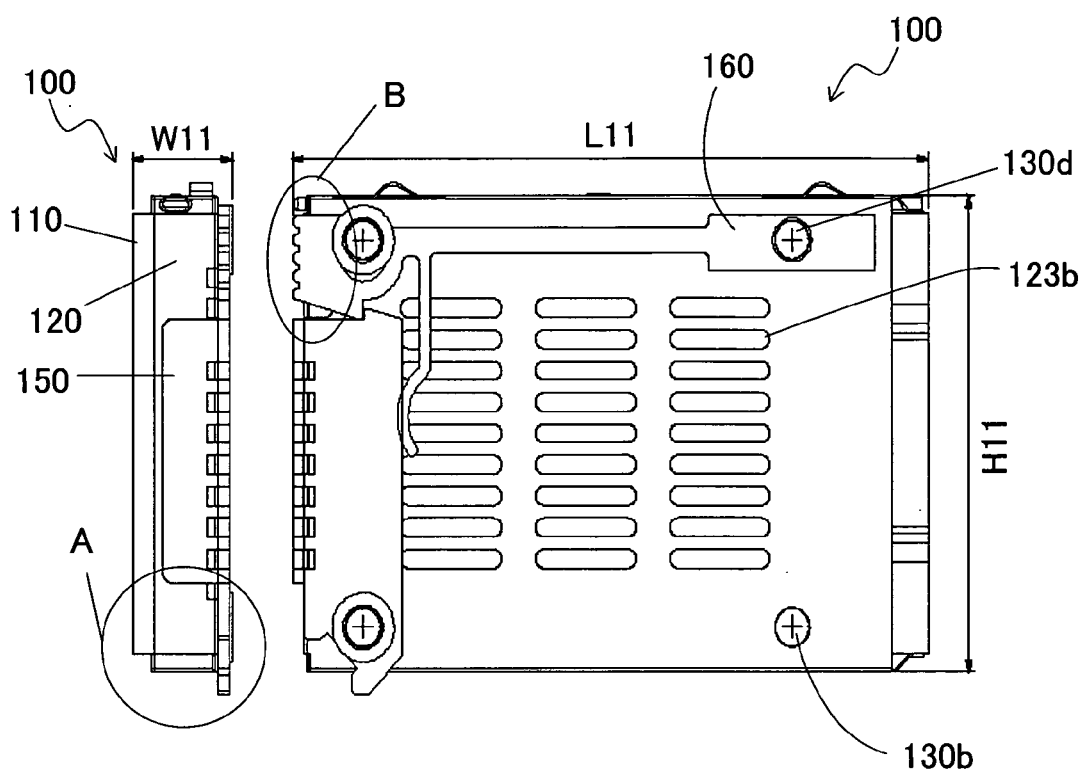
FIGS. 3A and 3B are front and side views of the HDD unit shown in FIG. 2.

A description will be given of an HDD unit 100 of one embodiment according to the present invention, with reference to the accompanying drawings. Here, FIG. 1 is a perspective overview of the HDD unit 100. FIG. 2 is an exploded perspective view of the HDD unit 100. FIG. 3A is a front view of the HDD unit 100, and FIG. 3B is a side view of the HDD unit 100.

The HDD unit 100 serves as a storage that records and reproduces information, and has, as shown in FIGS. 3A and 3B, a width W11, a length L11 and a height H11, which are, for example, 18 mm, 113.7 mm and 76 mm, respectively. The HDD unit 100 includes, as shown in FIGS. 1 and 2, a 2.5-inch HDD 110, a case or cover 120, fixing members 130a to 130d (which are screws in this embodiment), spacers 131a to 131d, a light guide tube 135, and an ejector mechanism 140.

Figures 4A, 4B:
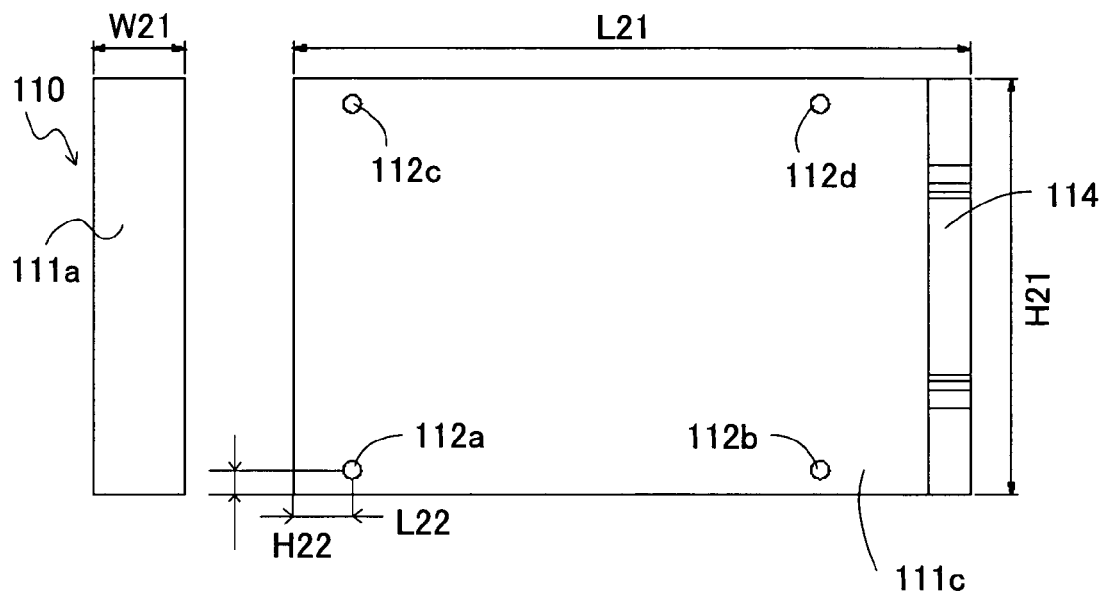
FIGS. 4A and 4B are front and side views of a 2.5-inch HDD in the HDD unit shown in FIG. 2.

The 2.5-inch HDD 110 is a body of the HDD unit 100, and houses a 2.5-inch magnetic disc. The 2.5-inch HDD 110 possesses, as shown in FIGS. 2, 4A and 4B, a rectangular parallelepiped shape that has a front surface 111a, a top surface 111b, a side surface 111c, and a rear surface 111d. The 2.5-inch HDD 110 has attachment holes 112a to 112d, and a connector 114. Here, FIG. 4A is a front view of the 2.5-inch HDD 110, and FIG. 4B is a side view of the 2.5-inch HDD 110. The 2.5-inch HDD 110 has, as shown in FIGS. 4A and 4B, a width W21, a length L21 and a height H21, which are, for example, 15 mm, 110.7 mm and 70.1 mm.

Figure 6:
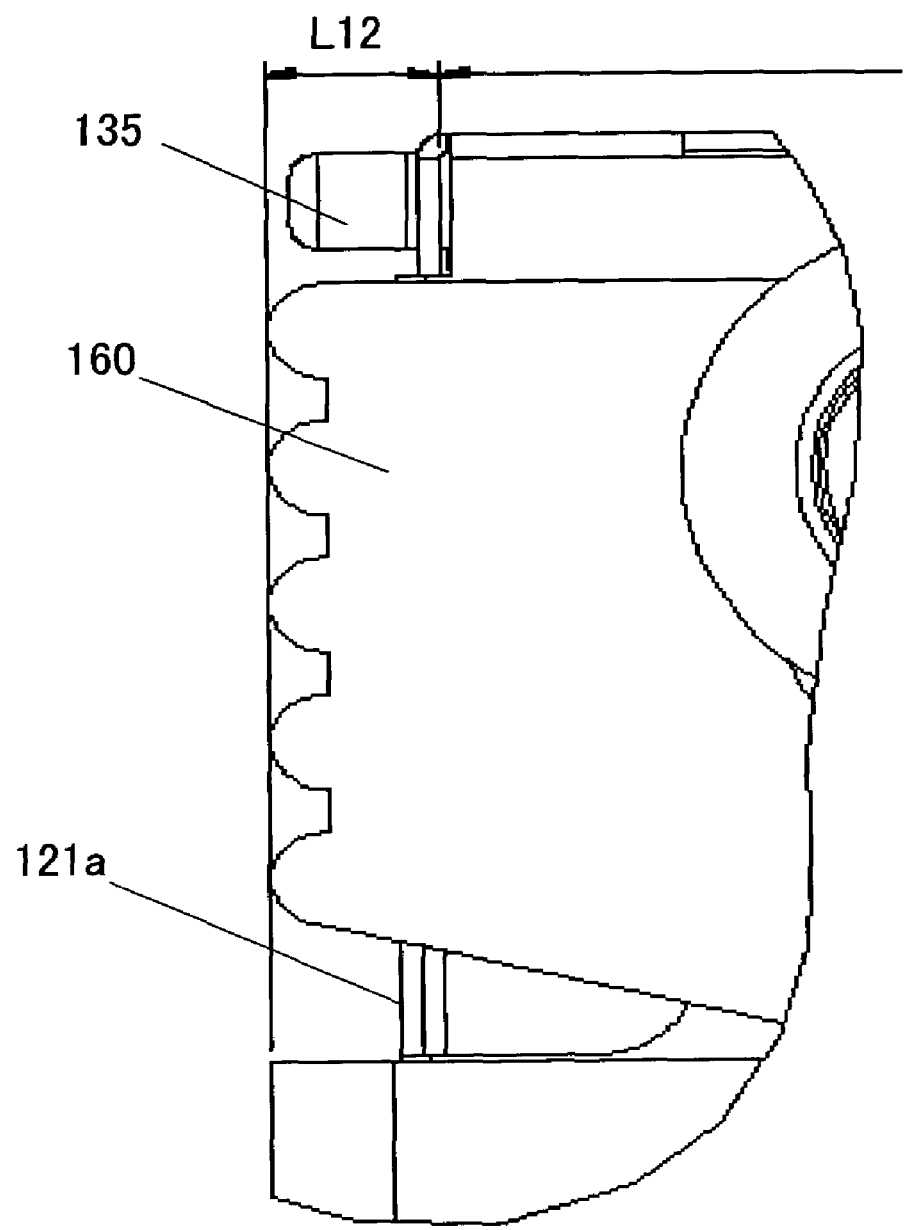
FIG. 6 is an enlarged sectional view at part B of the HDD unit shown in FIG. 3B.

Referring to FIGS. 3, 4A and 4B, a difference between the length L11 of the HDD unit 100 and the length L21 of the 2.5-inch HDD 110 is 113.7−110.7=3 mm. Referring to FIG. 6, a length L12 of the ejector mechanism 140 in the length L11 of the HDD unit 100, by which an arm 160 projects from a front surface 121a of the case 120 is about 3 mm. On the other hand, as shown in FIGS. 14A, 14B, 15A and 15B, a difference between the length L2 of the HDD unit 20 and the length L1 of the 3.5-inch HDD 30 is 204−147=57 mm. In view of the fact that the length L3 of the conventional ejector mechanism 42 is about 57 mm, the HDD unit 100 shortens the length of or miniaturizes the HDD unit 20 by remarkably shortening the length L12 of the ejector mechanism 140 in its length L11. Here, FIG. 6 is an enlarged side view of part B shown in FIG. 3B.

The attachment holes 112a to 112d are provided in the side surface 111c of the 2.5-inch HDD 110, and serve as screw holes, into which screws 130a to 130d are inserted for connections to the case 120. As discussed later, the attachment hole 112a is used to commonly fix the lever 150 of the ejector mechanism 140, and located at a position (length L22, height H22) from the lower left corner, as shown in FIG. 4B. The attachment holes 112c and 112d are used to commonly fix the arm 160 of the ejector mechanism 140.

Figure 7:
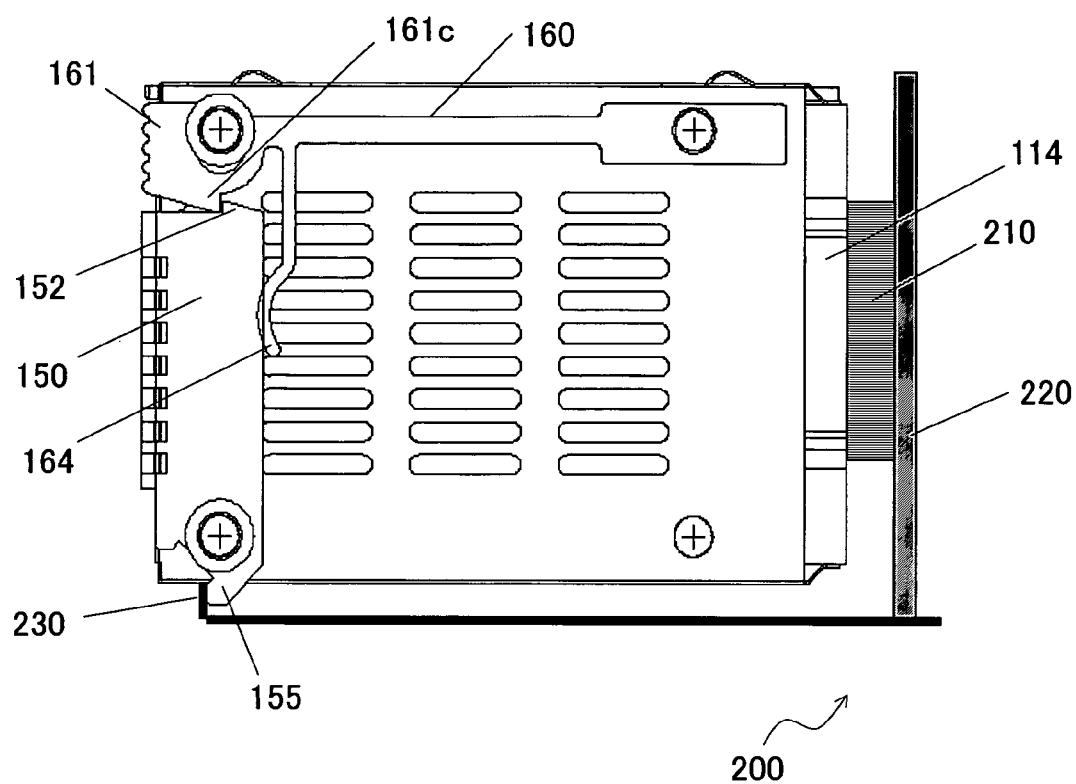
FIG. 7 is a sectional view for explaining an ejection of the HDD unit shown in FIG. 1 from the disc array storage.

The connector 114 is provided on the rear surface 111d of the 2.5-inch HDD 110, and electrically connected, as shown in FIG. 7, to a connector 210 of a disc array storage 200 for information transmissions and power supplies. The connector 210 is further connected to a back panel 220. Here, FIG. 7 is a sectional view of the HDD unit 100 installed in the disc array storage 200.

The case 120 protects the 2.5-inch HDD 110, and facilitates its insertion into and its ejection from the electronic apparatus 200. The case 120 is formed, for example, by bending a metal plate having a thickness of 0.4 mm. The case 120 has, as shown in FIG. 2, a front surface 121a, a top surface 121b and a side surface 121c. The case 120 opens on surfaces opposing to the front and side surfaces 121a and 121c, and has a tray shape that receives the 2.5-inch HDD 110. As a result, as shown in FIG. 1, the 2.5-inch HDD 110 projects in a width direction of the case 120. The case 120 has attachment holes 122a to 122d, radiation holes 123a and 123b, light guide tube attachment hole 124, and a pair of vibration absorbers 125a and 125b.

The attachment holes 122a to 122d are provided in the side surface 121c of the case 120. They are screw holes, into which the screws 130a to 130d are inserted for connections with the 2.5-inch HDD 110. As discussed later, the attachment hole 122a is used to commonly fix the lever 150 of the ejector mechanism 140, and the attachment holes 122c and 122d are used to commonly fix the arm 160 of the ejector mechanism 140.

The radiation holes 123a and 123b are perforation holes for radiations of the 2.5-inch HDD 110. The radiation holes 123a are provided at the corner between the front and side surfaces 121a and 121c. The radiation holes 123a are connected, as discussed later, to the radiation holes of the lever 150 of the ejector mechanism 140, and maintain connections between the external air and the 2.5-inch HDD 110. The radiation holes 123b are formed like an exemplary 9×3 matrix in the side surface 121c of the case 120, and maintain the connections between the external air and the 2.5-inch HDD 110. In this embodiment, the radiation holes 123b extend in a horizontal direction in FIG. 3B, because the cooling wind direction for cooling the 2.5-inch HDD 110 is the horizontal direction in FIG. 3B in the disc array storage 200.

The light guide tube attachment hole 124a passes the back of the top surface 121b of the case 120, and serves as a perforation hole, into which the light guide tube 135 is inserted. The light guide tube attachment hole 124a is connected to the space between the case 120 and the 2.5-inch HDD 110, and the light guide tube 135 is inserted into the space. The perforation hole 124b is a rectangular hole provided in the top surface 121b of the case 120 at an approximately center but close to the 2.5-inch HDD 110. The perforation hole 124b accepts a rectangular projection 135b of the light guide tube 135, and fixes the light guide tube 135.

The vibration absorbers 125a and 125 contact the top surface 111b of the 2.5-inch HDD 110, and each include a flat spring that absorbs the vibrations applied to the 2.5-inch HDD 110. The vibration absorbers 125a and 125b are provided along a longitudinal direction of the case 120 at the front and back of the top surface 121b of the case 120.

Figure 5:
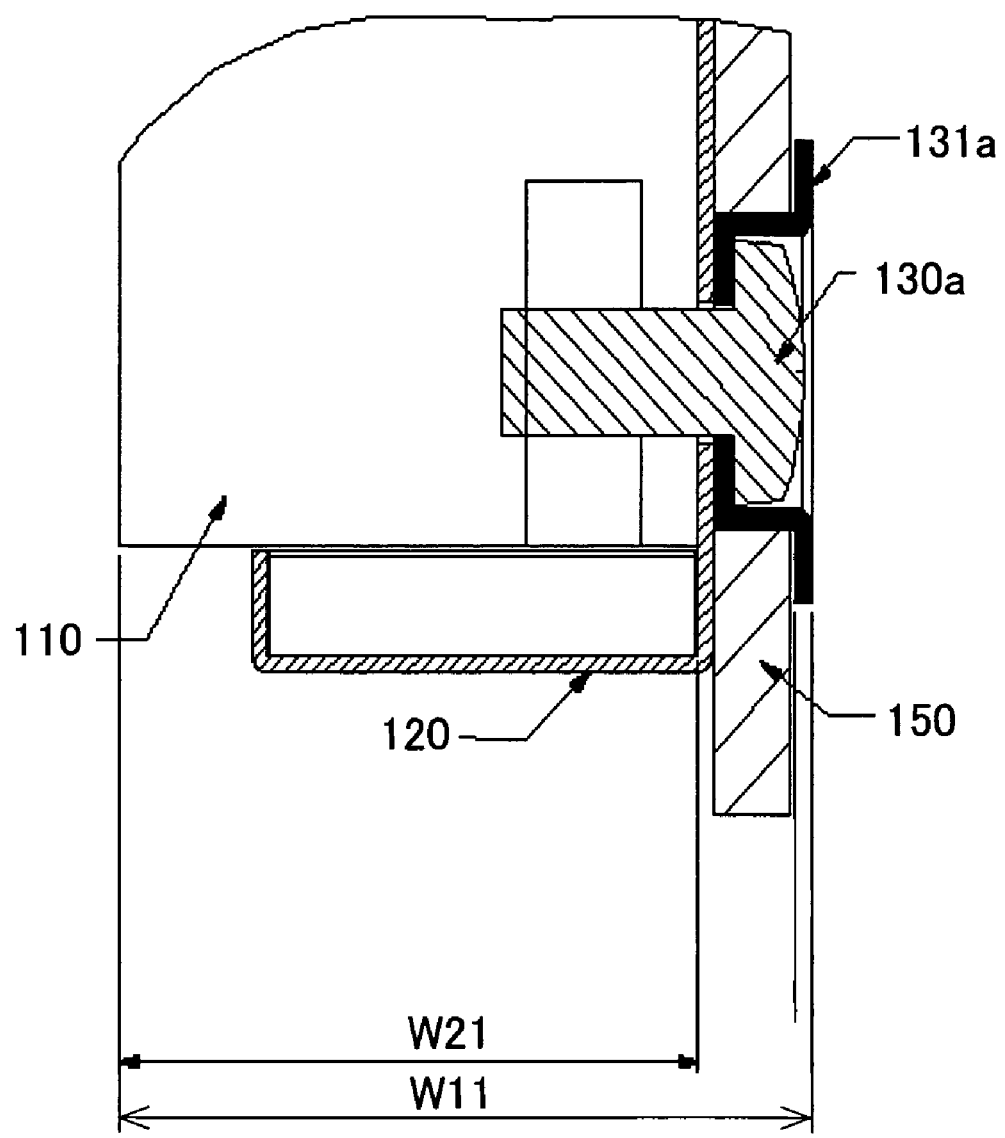
FIG. 5 is an enlarged sectional view at part A of the HDD unit shown in FIG. 3A.

The screws 130a to 130d serve as fixing members that are inserted into the attachment holes 112a to 112d and 122a to 122d, and commonly fix the 2.5-inch HDD 110, the case 120, and the ejector mechanism 140. The screws 130a to 130d are one exemplary fixing member, and the present invention covers any mechanical means, such as a bolt and a nut. The screw 130a is inserted into the attachment holes 122a and 112a via the spacer 131a and the attachment hole 154 of the lever 150 in the ejector mechanism 140. FIG. 5 is an enlarged view of the part A shown in FIG. 3A. The screw 130c is inserted into the attachment holes 122c and 112c via the spacer 131b and an attachment hole 161a of the arm 160 in the ejector mechanism 140. The spacer 131a enables the lever 150 to rotate around the screw 130a. The spacer 131b enables a fixed part 161 of the arm 160 to move relative to the screw 130c.

The light guide tube 135 is an optical fiber to indicate a state of the HDD unit 100, and has an approximately T shape as shown in FIG. 2. The light guide tube 135 is inserted into the attachment hole 124, and projects from the top of the front surface 121a of the case 120, as shown in FIG. 1. The light guide tube 135 has the projection 135a at the center top in the longitudinal direction as discussed above, and the projection 135a slightly bends so that the projection 135a forms an upward convex. The projection 135a is engaged with the attachment hole 124b, and thus the light guide tube 135 is fixed in the case.

The ejector mechanism 140 enables the HDD unit 100 to be inserted into and ejected from the disc array storage 200, and is provided on the side surface 121c of the case 120. The ejector mechanism 140 locks the engagement between the loaded HDD unit 100 and the disc array storage 200. The ejector mechanism 140 includes the lever 150 and the arm 160.

Figure 13:
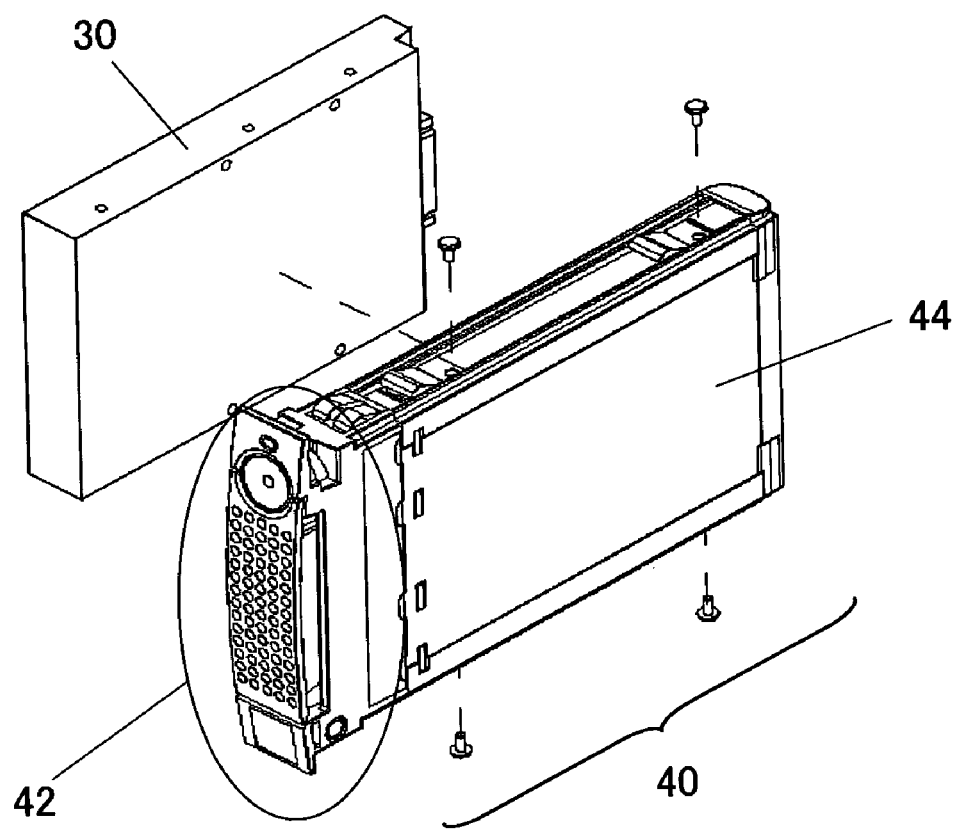
FIG. 13 is an exploded perspective view of the conventional HDD unit shown in FIG. 12.

The lever 150 is a member to which a force is applied to insert the HDD unit 100 into and to eject the HDD unit 100 from the disc array storage 200. The lever 150 has an approximately L shape by bending a metal plate having a thickness of 2 mm by a right angle, and is fixed onto the case 120 foldably and unfoldably relative to the case 120. The lever 150 may be made of resin. While the metallic lever 150 may possibly be hot due to the heat and of the HDD unit 100, the resin lever 150 preferably solves this problem. Here, the folding position of the lever 150 is a position shown in FIG. 7, and the unfolding position of the lever 150 is a position shown in FIG. 9, which will be described later. While the instant embodiment allows the lever 150 to rotate by 90° for folding and unfolding, the rotating angle is not limited to 90°. For example, as shown in the ejector mechanism 42 shown in FIG. 13, the lever 150 may be formed like a curve shape.

Since the lever 150 is L-shaped, the lever 150 and the case 120 are engaged with each other via the side and front surfaces 121c and 121a of the case 120, and the folding and unfolding mechanism of the lever 150 can be located on the side surface 121c of the case 120. As a result, the front surface 121a of the case 120 has a simple structure, and the length of the case 120 can be reduced.

Figure 9:
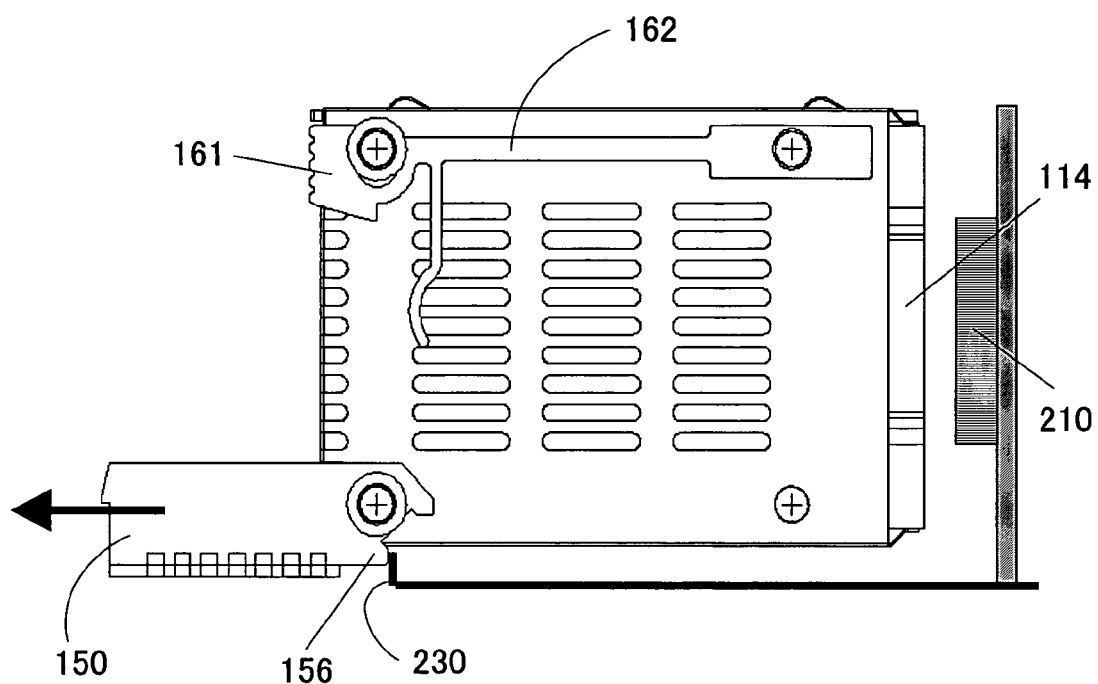
FIG. 9 is a sectional view for explaining an ejection of the HDD unit shown in FIG. 1 from the disc array storage.

The lever 150 includes a front plate 151a and a side plate 151b, which form the L shape, an engagement member 152, radiation holes 153, an attachment hole 154, a tab 155, a connection release member 156, and a bevel 157 (FIG. 9). The radiation holes 153 are provided on the boundary between the front and side plates 151a and 151b, and connected to the radiation holes 123a of the case 120.

The front plate 151a is a member to be held by a user when the lever 150 unfolds, and to which a force is applied at the time of the insertion and ejection. The front plate 151a enables the force to be applied approximately symmetrically with respect to the front surface of the HDD unit 110. The front plate 151a contacts the front surface 121a of the case 120, and prevents the lever 150 from rotating clockwise in FIG. 1. The front plate 151a covers only a center of the front surface 121a of the case, because a serration 161b of the arm, which will be described later, is arranged at the top of the front surface 121a, and if the front plate 151a covers the lower portion of the front surface 121a the front plate 151a would prevent smooth rotations of the lever 150.

The side plate 151b includes the engagement member 152, the attachment hole 154, the tab 155, the connection release member 156, and the bevel 157.

The engagement member 152 is a projection provided at the upper right part on the side plate 141b, and engaged with an engagement member 161c of the arm 160 when the lever 150 is located at the folding position as shown in FIG. 7. While the engagement members 152 and 161c extend vertically in the instant embodiment, they may be inclined at predetermined angles or unevenly shaped.

Figure 14A:
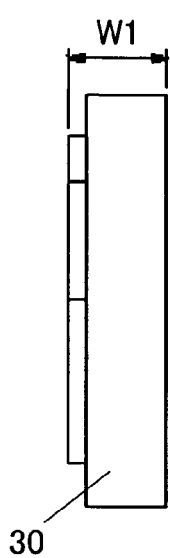
FIGS. 14A and 14B are front and side views of a 3.5-inch HDD in the conventional HDD unit shown in FIG. 13.
Figure 14B:
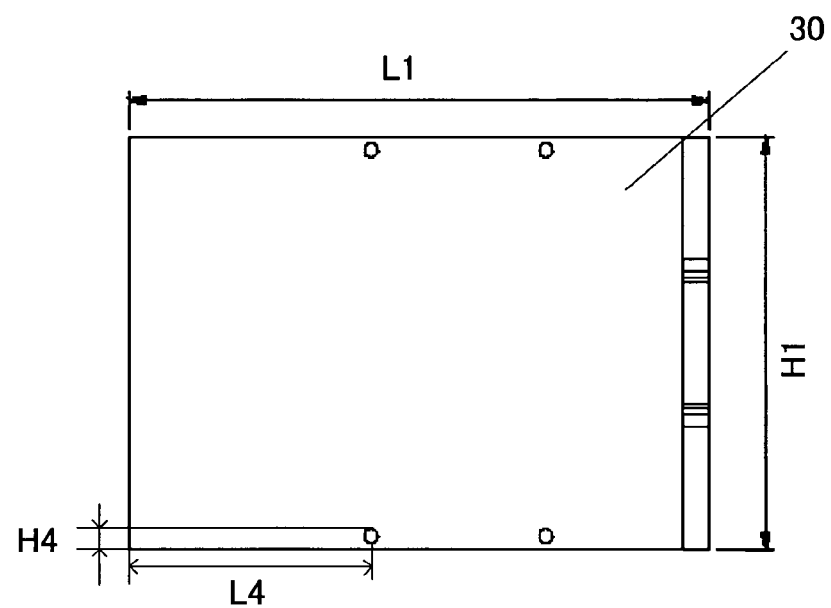
Figure 15A:
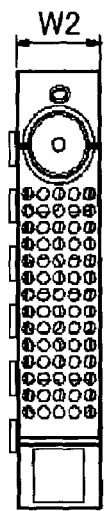
FIGS. 15A and 15B are front and side views of a case in the conventional HDD unit shown in FIG. 13.
Figure 15B:
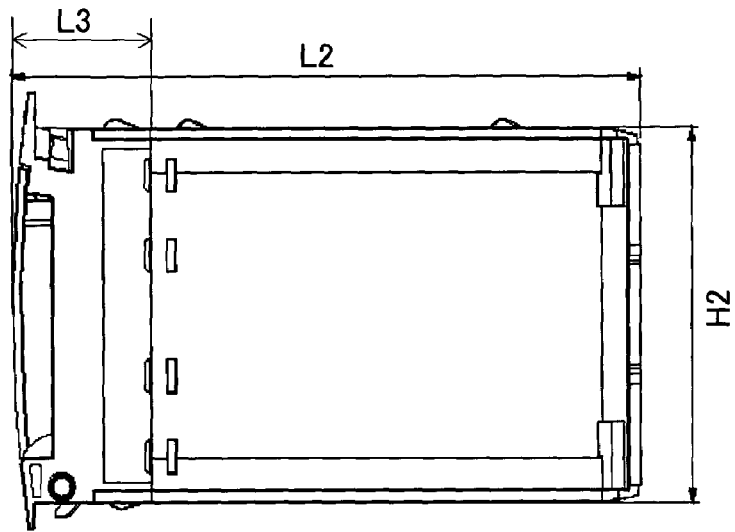

The attachment hole 154 is formed at the bottom center of the side plate 151b, and forms a rotational center of the lever 150. The side plate 151b is fixed onto the side surface 121c of the case 120 rotatable by 90° via the attachment hole 154, the screw 130a and the spacer 131a. Since the side plate 151b of the lever 150 can fold and unfold (or rotate) around the screw 130a, the ejector mechanism 140 can be smaller than the prior art that provides the folding and unfolding mechanism as a separate member. The attachment hole 154 is aligned with the attachment hole 112a of the 2.5-inch HDD 110 as described with reference to FIG. 4B, which is formed at almost the corner of the 2.5-inch HDD 110. On the other hand, a lower left position (L4, H4) of the attachment hole 112a shown in FIG. 14B is, for example, (61.27 mm, 3.17 mm), and L4 is so large that the attachment hole is not formed at the corner of the 3.5-inch HDD 30. Therefore, in the conventional 3.5-inch HDD 30, a mere common fixation through the lower left attachment hole shown in FIG. 14B would increase the rotational radius of the ejector mechanism 42 and would not miniaturize the HDD unit 20. The instant embodiment arranges the attachment holes 112a and 122a for the common fixation, at the corner of the HDD unit 100, and reduces the rotational radius of the lever 150, making the ejector mechanism 140 small.

The tab 155 is formed under the attachment hole 154 of the side plate 151b. The tab 155 is engaged with a guide 230 of the disc array storage 200 when the lever is located at the folding position, as shown in FIG. 7, and fixes the HDD unit 100 onto the disc array storage 200. This engagement prevents unintentional ejections of the HDD unit 100 from the disc array storage 200 due to vibrations etc., electronic disconnections between them, and damages of the connectors 114 and 210. While the tab 155 and the guide 230 extend in the vertical direction in the instant embodiment as shown in FIG. 7, they may be inclined at predetermined angles or unevenly shaped.

The connection release member 156 is formed at the left side of the attachment hole 154 of the side plate 151b. The connection release member 156 contacts and presses the guide 230 of the disc array storage 200, as shown in FIG. 9, which will be described later, and disconnects the connector 114 and 210 from each other. The bevel 157 is rotated clockwise in FIG. 9 in an attempt to attach the HDD unit 100 to the disc array storage 200. The bevel 157 slides on a bevel 161d of a fixed member 161 of the arm 160, and moves the fixed member 161 upwardly. This action results in the state shown in FIG. 7.

The arm 160 is an engagement member that is provided on the side surface 121c of the case 120, made of an elastic material, such as resin, and has an approximately T shape. The arm 160 includes a fixed member 161, a support member 162, a fixed member 163, and a forcing member 164.

The fixed member 161 is fixed onto the side surface 121c of the case 120 so that it can move between lock and unlock positions. Here, the "lock position" is a position where the fixed member 161 is engaged with the folded lever 150 and locks the lever 150 at the folding position as shown in FIG. 7. The "unlock position" is a position where a lock of the lever 150 is released and the lever 150 is allowed to unfold from the case 120, as shown in FIG. 8.

In the conventional example shown in FIGS. 12 to 15, a direction in which the eject button (not shown) is pressed (or the moving direction of the eject button) is perpendicular to the front surface of the case 40. Thus, the L3 becomes long, and the case becomes big in the longitudinal direction. On the other hand, according to the arm 160 of this embodiment, the fixed member 161 moves along the side surface 121c of the case 120, and the HDD unit 100 does not become big in the perpendicular direction to the side surface 121c. The HDD unit 100 becomes at most wider by the thickness of the fixed member 161.

In addition, in the conventional example, the engagement member is part of the case, and the lever is engaged with the case. On the other hand, in this embodiment, the arm 160 is a separate member from the case 120, and the lever 150 is engaged with the arm 160 rather than the case 120. This embodiment has a higher degree of freedom of arrangement between the arm 160 and the case 150, and the ejector 140 of this embodiment can select the arrangement between the arm 160 and the case 150 so that the case 120 can be maintained small.

Figure 8:
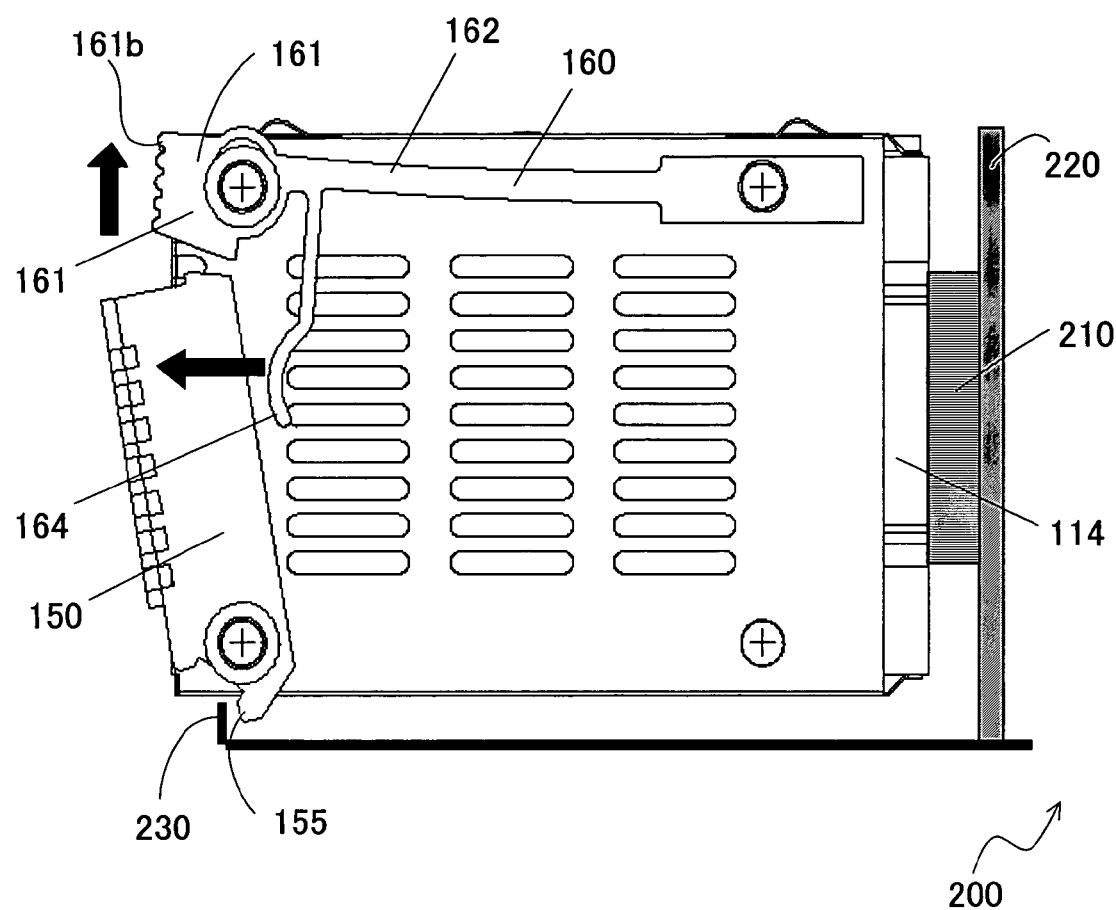
FIG. 8 is a sectional view for explaining an ejection of the HDD unit shown in FIG. 1 from the disc array storage.

FIG. 8 is a sectional view for explaining an ejecting action of the HDD unit from the disc array storage 200. The fixed member 161 has an attachment hole 161a, a serration 161b, and an engagement member 161c.

The fixed member 161 is fixed onto the side surface 121c of the case 120 with the 2.5-inch HDD 110 via the screw 130c, the spacer 131b, and the attachment hole 161a. The attachment hole 161a has an elliptical shape that is made by extending a circle longitudinally. Therefore, the fixed member 161 can move in the longitudinal direction of the attachment hole 161a or in the upper direction.

The serration 161b is an undulant member formed at the end of the fixed member 161, to which a force is applied when the fixed member 161 is moved from the lock position to the unlock position. The serration 161b facilitates an engagement with the user's finger that moves on the arm 160, improving the operability. In addition, the serration 161b has a simpler and smaller structure than a provision of an eject button etc., and promotes the miniaturization of the ejector mechanism 140. A convex part of the serration 161b is approximately level with the front plate 151a of the folded lever 150. If the serration 161b protrudes, something may be caught by the serration 161b when the HDD unit 100 is inserted into the disc array storage 200, and the HDD unit 100 may be consequently ejected unintentionally. The serration 161b of the arm 160 when the arm 160 is made of resin is not affected by the temperature rise after the HDD unit 100 is driven, and provides the good operability to a user.

The engagement member 161c is a projection that is engaged with the engagement member 152 of the lever 150 when the fixed member 161 is located at the lock position, and releases the engagement with the engagement member 152 of the lever 150 when the fixed member 161 is located at the unlock position. The engagement member 161c protrudes below the attachment hole 161a.

The support member 162 is a rod-shaped member that connects the fixed members 161 and 163 to each other. When the fixed member 161 moves from the lock position to the unlock position, the support member 162 deforms upwardly and generates a reset force for returning to the original state due to its own elastic force. As a result, the fixed member 161 that has moved to the unlock position receives a force to return to the lock position. Since the support member 162 is elastic and self-propelled, no independent reset means, such as a tension spring, is necessary. The reduced number of components contributes to the miniaturization.

The fixed member 163 is fixed non-movably onto the side surface 121c of the case 120 by the screw 130d. Since the fixed member 163 is connected to one end of the support member 162, a structure that does not allow movements of the fixed member 163 when the fixed member 161 moves generates an elastic force to return the fixed member 161 to the lock position. The common fixation enables the arm 160 to move or displace around the fixed member 163 or the screw 130d, and no independent drive means is necessary unlike the prior art, making the ejector mechanism smaller.

The forcing member 164 applies a force to the top of the side plate 151b in the unfolding direction of the lever 150, as shown in FIG. 7, when the engagement members 161c and 152 are engaged with each other. The forcing member 164 extends downwardly from the support member 161 near the fixed member 161, and includes a vertical portion 164a and a curved portion 164b. The vertical portion 164a is connected to the support member 162 and extends downwardly approximately perpendicular to the support member 162. The curved portion 164b is connected to the vertical portion 164a, and contacts the side plate 151b. A combination of the vertical portion 164a and the curved portion 164b can make the forcing member 164 as small as possible, and allows the forcing member 164 to be located near the lever 150. The curved portion 164 is elastically deformable and applies an elastic force to the side plate 151b. Since the forcing member 164 is elastically deformable and self-propelled, no independent forcing means, such as a compression spring, is necessary. The reduced number of components contributes to the miniaturization of the ejector mechanism 140.

Referring now to FIGS. 7 to 9, a description will be given of the ejection of the HDD unit 100 from the disc array storage 200. Here, FIG. 9 is a sectional view for explaining the ejection action of the HDD unit from the disc array storage 200, following the state shown in FIG. 8. In order to insert the HDD unit 100 into the disc array storage 200, the reverse action to the following description will be conducted.

First, when the fixed member 161 is located at the lock position shown in FIG. 7, the engagement members 152 and 161c are engaged with each other and the lever 150 is locked to the folding state. The tab 155 is engaged with the guide 230, preventing the HDD unit 100 from being unintentionally ejected from the disc array storage 200 due to the vibrations, etc. In addition, the connectors 114 and 210 are connected to each other, and the HDD unit 100 and the disc array storage 200 are electrically connected to each other. The HDD unit 100 is supplied with power, and records and reproduces information. The forcing member 164 applies a compression force to the lever 150.

Next, a user engages his finger with the serration 161b, lifts up the fixed member 161 in the arrow direction in FIG. 8, and moves the fixed member 161 along the attachment hole 161a to the unlock position. A direction in which the fixed member 161 moves from the lock position to the unlock position is substantially orthogonal to a direction in which the HDD unit 100 is ejected from the disc array storage 200 (or the arrow direction in FIG. 9). The phrase "substantially orthogonal" intends to cover a not completely orthogonal case because the fixed member 161 rotates around the screw 130d. Anyway, the configuration that makes the moving directions orthogonal eliminates a necessity to maintain the space for the arm 160 to move in the direction in which the HDD unit 100 is ejected from the disc array storage 200 or in the length direction of the HDD unit. Therefore, this configuration makes the HDD unit 100 or the case 120 shorter.

In the state shown in FIG. 8, the engagement members 152 and 161c are disengaged from each other, and the lever 150 is unlocked from the folding state. The tab 155 is disengaged from the guide 230, and the HDD unit 100 can be ejected from the disc array storage 200. However, the engagement between the connectors 114 and 210 is still maintained in this state, and the HDD unit 100 is held in the disc array storage 200. Moreover, the elastic force by the forcing member 164 inclines the lever 150 in the front arrow direction, and the user easily rotates the lever 150 to the front. As a result, the forcing member 164 is spaced from the lever 150. The support member 162 generates a force to return to the state shown in FIG. 7.

Next, the user separates his finger from the serration 161b. Then, the reset force applied to the support member 162 resets the fixed member 161 to the state shown in FIG. 7. While the lever 150 is moving to the unfolding position shown in FIG. 9, the connection release member 156 contacts the guide 230 of the disc array storage 200. When the user rotates the lever 150 to the unfolding position so that the rotational angle becomes 90°, the connection release member 156 presses the guide 230 and disconnects the connectors 114 and 210 from each other consequently. The lever's unfolding action serves to release the electric connection between the HDD unit 100 and the disc array storage 200, improving the operability. Thereby, no force holds the HDD unit 100 in the disc array storage 200, and the user can eject the HDD unit 100 from the disc array storage 200 by holding and pulling out the front plate 151a of the lever 150 in the front arrow direction.

Figure 17:
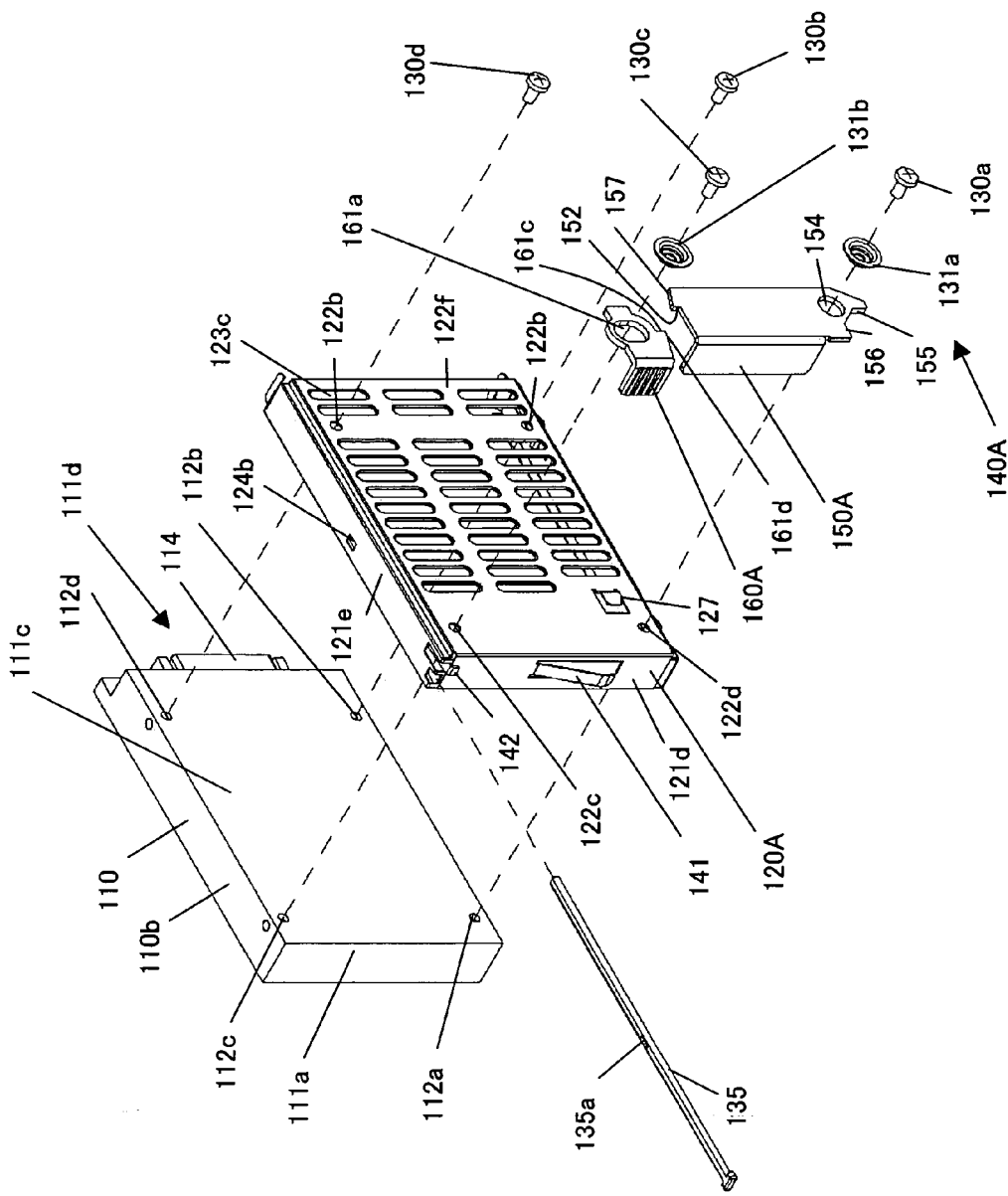
FIG. 17 is an exploded view of the HDD unit shown in FIG. 16.
Figure 18:
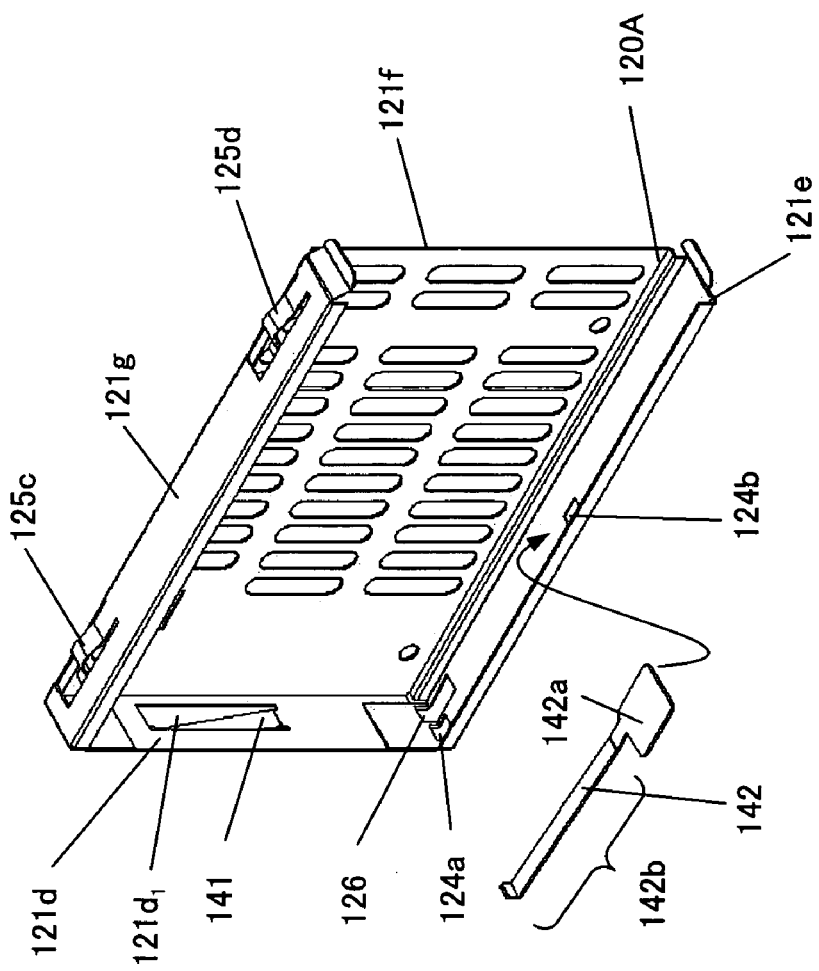
FIG. 18 is a perspective overview showing the way of attaching a flat spring to a case of the HDD unit shown in FIG. 16.

Referring now to FIGS. 16 to 21, a description will be given of an HDD unit 100A according to another embodiment of the present invention. Here, FIG. 16 is a perspective overview of the HDD unit 100A. FIG. 17 is an exploded perspective view of the HDD unit 100A. FIG. 18 is an exploded perspective view showing a backside of a case 120A of the HDD unit 100A. Those elements of the HDD unit 100A, which are the same as corresponding elements of the HDD unit 100, are designated by the same reference numerals, and a description thereof will be omitted.

The HDD unit 100A serves as a storage that records and reproduces information, and includes, as shown in FIGS. 16 and 17, the 2.5-inch HDD 110, a case or cover 120A, the fixing members (screws) 130a to 130d, the spacers 131a to 131d, the light guide tube 135, and an ejector mechanism 140A.

The case 120A protects the 2.5-inch HDD 110, and facilitates its insertion into and its ejection from the electronic apparatus 200. The case 120A is formed, for example, by bending a metal plate having a thickness of 0.4 mm. The case 120A has, as shown in FIGS. 17 and 18, a front surface 121d, a top surface 121e, a side surface 121f, and a bottom surface 121g. The case 120A opens on surfaces opposing to the front and side surfaces 121d and 121f, and has a tray shape that receives the 2.5-inch HDD 110. The case 120A has the attachment holes 122a to 122d, radiation holes 123c, the light guide tube attachment hole 124a, the fixing hole 124b, a pair of vibration absorbers 125c and 125d, a spring attachment hole 126, and an engagement part 127.

The radiation holes 123c are perforation holes for radiations of the 2.5-inch HDD 110. Unlike the radiation holes 123b, the radiation holes 123c extend in the vertical directions, because the cooling wind direction for cooling the 2.5-inch HDD 110 is the perpendicular direction in FIG. 16 in the disc array storage 200. Therefore, no radiation holes 123a are provided. The vibration absorbers 125c and 125d have similar functions as the vibration absorbers 125a and 125b, but are different from them in that the vibration absorbers 125c and 125d are provided on the bottom surface 121g.

The spring attachment hole 126 is a perforation hole provided, as shown in FIG. 18, so that it penetrates through the back of the top surface 121d of the case 120A, and the spring 142 is attached to the spring attachment hole 126. Similar to the light guide tube attachment hole 124a, the spring attachment hole 126 is connected to the space between the case 120A and the 2.5-inch HDD 110, and the spring 142 is housed in this space partially parallel to the light guide tube 135.

The engagement part 127 is formed, as shown in FIG. 17, by cutting and bending the side surface 121f of the case 120A to the outside, and contacts the bevel 158 of the lever 150A, which will be described later, restricting the counterclockwise rotations of the lever 150A from the state shown in FIG. 21.

The ejector mechanism 140 enables the HDD unit 100A to be inserted into and ejected from the disc array storage 200, and is provided on the side surface 121f of the case 120A. The ejector mechanism 140A locks the engagement between the loaded HDD unit 100A and the disc array storage 200. The ejector mechanism 140 includes springs 141 and 142, a lever 150A and an engagement member 160A.

The spring 141 is a flat spring formed by cutting and bending the front surface 121d of the case 120A to the outside. The spring 141 can project from and retreat into a hole 121$d_1$ provided in the front surface 121$d$.

The spring 142 is a flat spring that is at least partially provided between the 2.5-inch HDD 110 and the case 120A, and serves to force the engagement member 160A to the lock position. The spring 142 has a fixing part 142$a$, and a moving part 142$b$. The fixing part 142$a$ has an approximately rectangular shape, and is fixed onto the back of the top surface 121$e$ of the case 120A by spot welding. The fixing part 142$a$ is almost as wide as the back of the top surface 121$e$, and the length of the fixing part 142$a$ is set in view of the strength that can maintain the force by the moving part 142$b$. The moving part 142$b$ contacts and forces the engagement member 160A. The moving part 142$b$ is arranged parallel to the light guide tube 135, and does not enlarge the unit since it utilizes the inherent space for the light guide tube 135.

The force by the spring 142 is set greater than that of the spring 141. The reverse force relationship may possibly shift the state shown in FIG. 19 to the state shown in FIG. 20, and disengage the engagement member 160A from the lever 150A.

The lever 150A is a member to which a force is applied to insert the HDD unit 100A into and to eject the HDD unit 100A from the disc array storage 200. The lever 150A is made of resin, has an approximately L shape, and is fixed onto the case 120A foldably and unfoldably relative to the case 120A. The folding position of the lever 150 is a position shown in FIG. 19, and the unfolding position of the lever 150 is a position shown in FIG. 21, which will be described later. The effects of the L-shaped lever 150A are similar to those of the lever 150. The lever 150A includes a front plate 151$c$ and a side plate 151$d$, which form the L shape, the engagement member 152, the attachment hole 154, the tab 155, the connection release member 156, and bevels 157 and 158.

The front plate 151$c$ and side plate 151$d$ do not have the radiation holes 153 at their boundary, but substantially serve as the front plate 151$a$ and the side plate 151$b$. However, in this embodiment, the back of the front plate 151$c$ dents at a portion that contacts the spring 141, and the spring 141 is engaged with the dent of the front plate 151$c$.

The side plate 151$b$ includes the engagement member 152, the attachment hole 154, the tab 155, the connection release member 156, and the bevels 157 and 158. When the lever 150 is located at the unfolding position, the bevel 158 contacts the engagement part 127. The lever 150A does not rotate counterclockwise from the state shown in FIG. 21, and this configuration prevents unnecessary rotations of the lever 150A and improves the operability.

The engagement member 160A is provided on the side surface 121$f$ of the case 120A, and made of an elastically deformable material, such as resin. The engagement member 160A has an approximately L shape, and includes a fixed member 161A and a forced member 165.

The fixed member 161A is fixed onto the side surface 121$f$ of the case 120A so that it can move between lock and unlock positions. Since the fixed member 161A moves along the side surface 121$f$ of the case 120A, and the HDD unit 100A does not become big in the perpendicular direction to the side surface 121$f$. Similar to the arm 160 and the lever 150, the configuration of this embodiment has a high degree of freedom of arrangement between the engagement member 160A and the lever 150A. The fixed member 161A has the attachment hole 161$a$, the engagement member 161$c$, and a bevel 161$d$.

The forced member 165 is a member that contacts the moving part 142$b$ of the spring 142 and receives the down force in FIG. 16 from the spring 142. The forced member 165 has a serration that serves similarly as the serration 161$b$. The forced member 165 is arranged parallel to and slightly apart from the front surface 121$d$ of the case 120A, preventing rotations of the engagement member 160A. The slight spacing is to maintain smooth vertical movement of the fixed member 161. It is experimentally confirmed that the actions of the engagement member 160A are more stable when a downward force is applied to the forced member 165 than when an upward force is applied to the fixed member 161.

Figure 19:
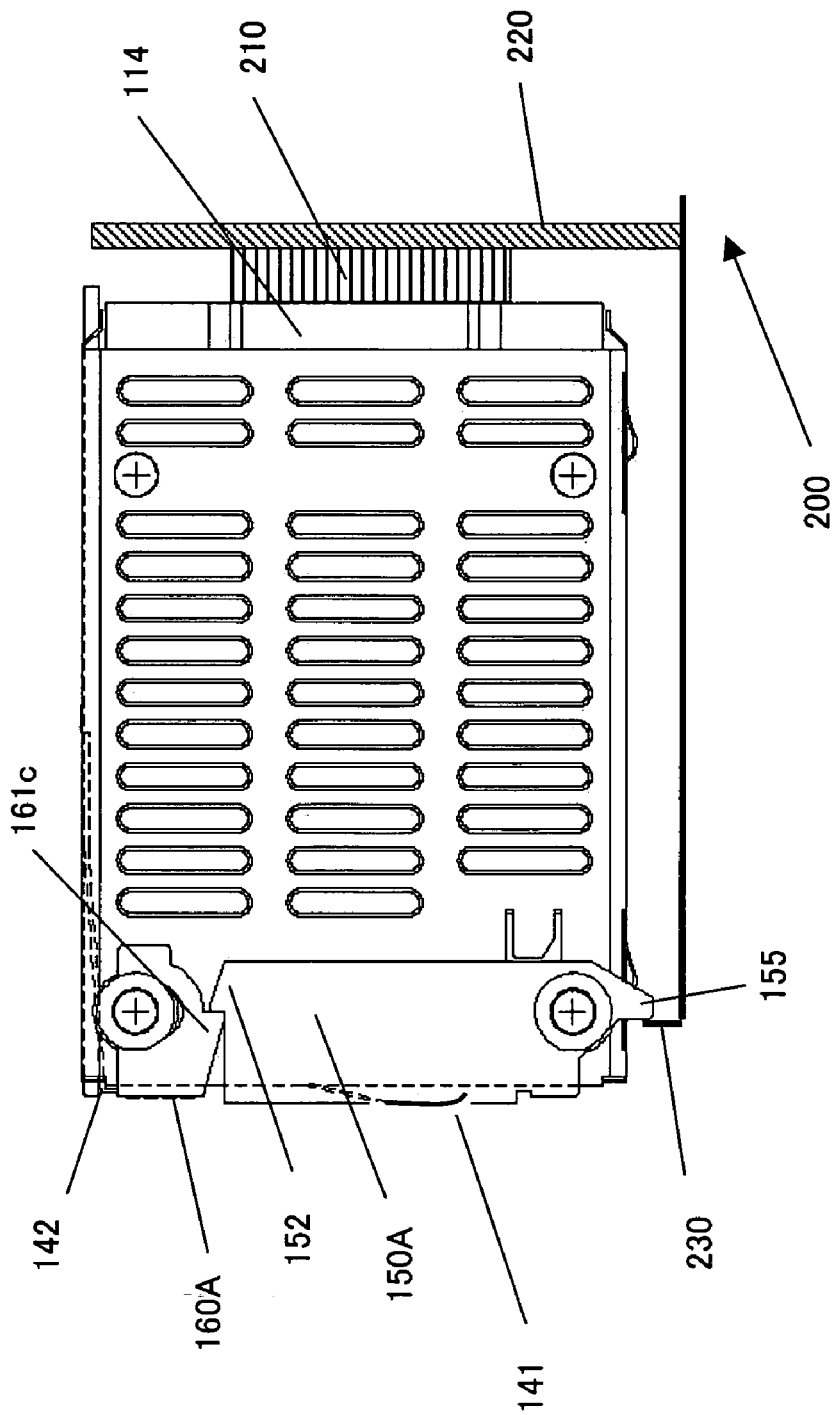
FIG. 19 is a sectional view for explaining an ejection of the HDD unit shown in FIG. 16 from the disc array storage.
Figure 20:
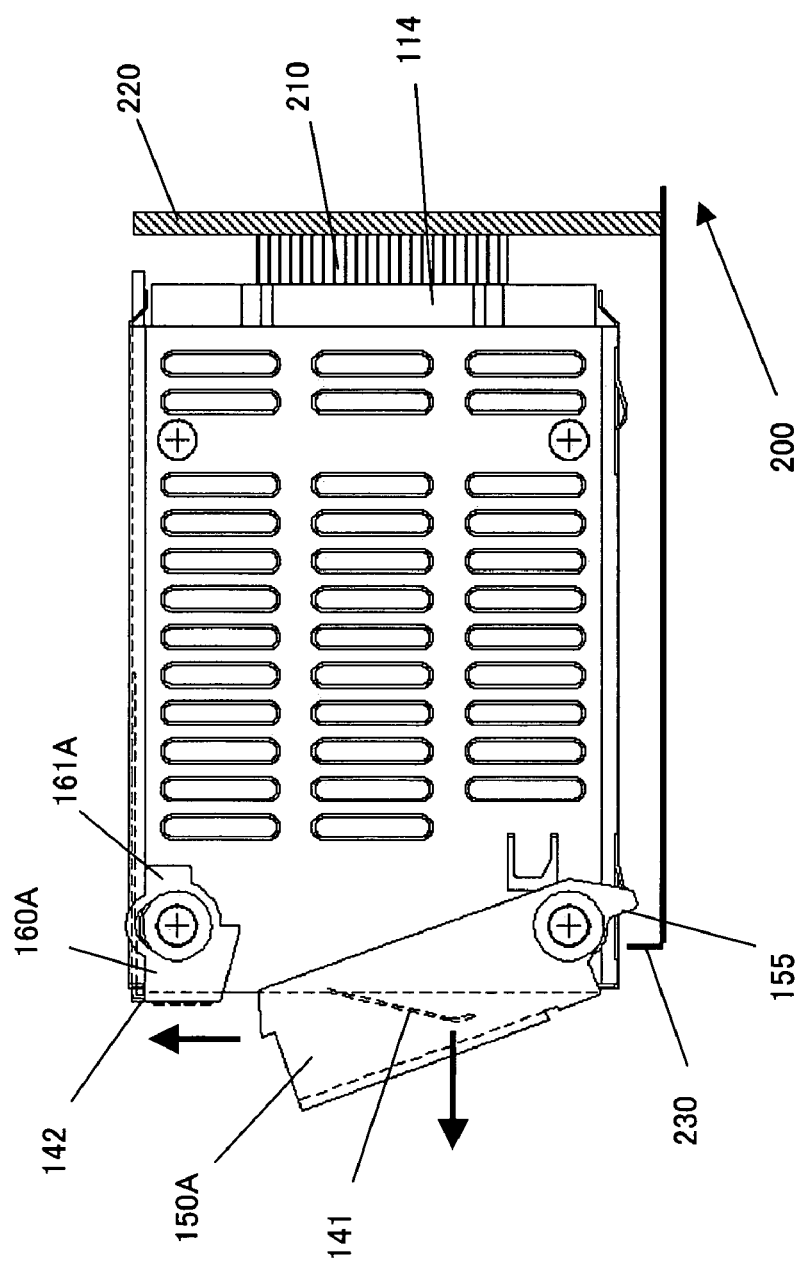
FIG. 20 is a sectional view for explaining an ejection of the HDD unit shown in FIG. 16 from the disc array storage.
Figure 21:
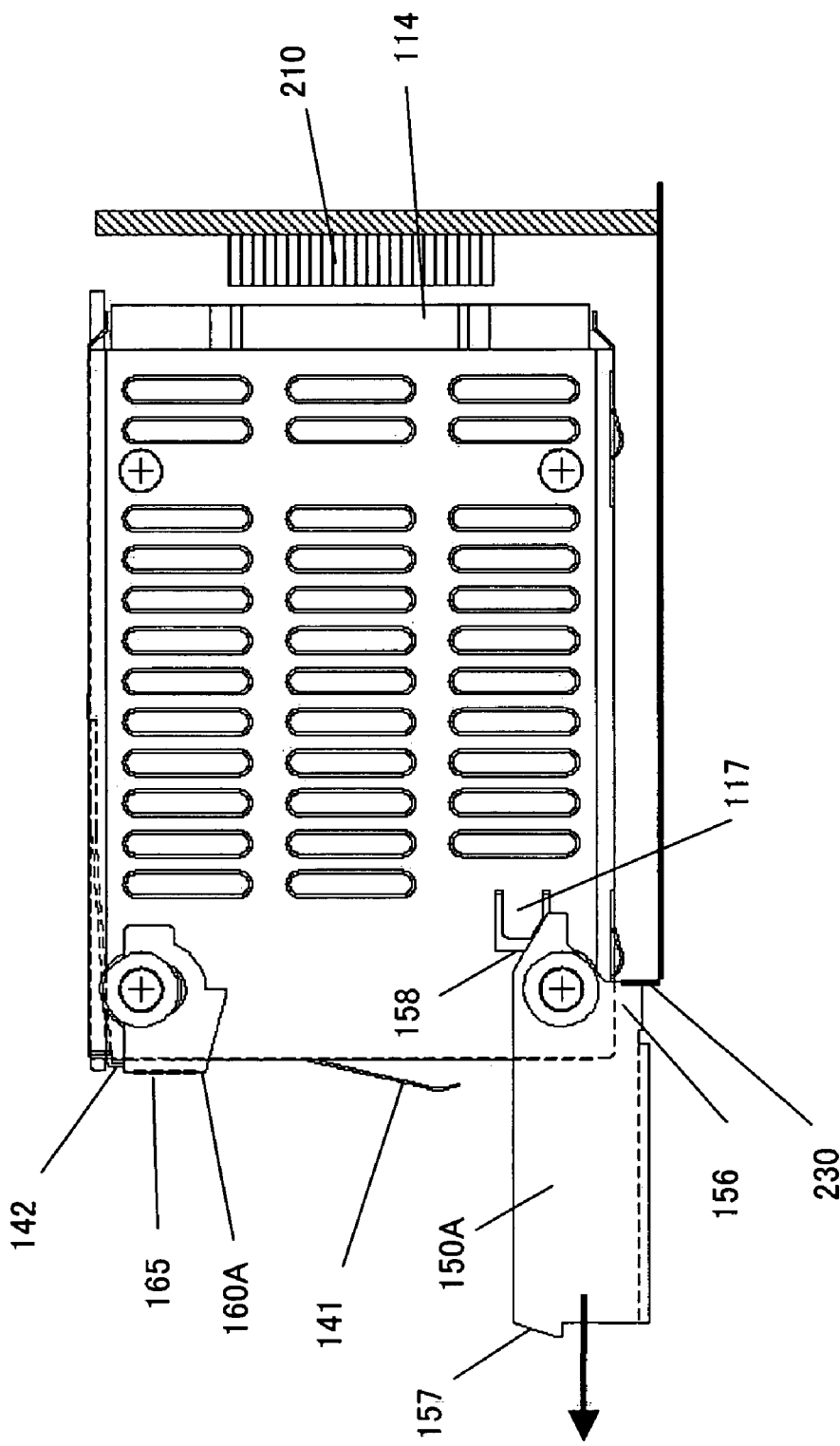
FIG. 21 is a sectional view for explaining an ejection of the HDD unit shown in FIG. 16 from the disc array storage.

Referring now to FIGS. 19 to 21, a description will be given of the ejection of the HDD unit 100A from the disc array storage 200. Here, FIG. 19 is a sectional view of the HDD unit 100A loaded into the disc array storage 200. FIG. 20 is a sectional view for explaining the ejection action of the HDD unit 100A from the disc array storage 200. FIG. 21 is a sectional view for also explaining the ejection action of the HDD unit 100A from the disc array storage 200, following the state shown in FIG. 20. In order to insert the HDD unit 100A into the disc array storage 200, the reverse action to the following description will be conducted.

First, when the fixed member 161 is located at the lock position shown in FIG. 19, the engagement members 152 and 161$c$ are engaged with each other and the lever 150A is locked to the folding state. The tab 155 is engaged with the guide 230, preventing the HDD unit 100A from being unintentionally ejected from the disc array storage 200 due to the vibrations, etc. In addition, the connectors 114 and 210 are connected to each other, and the HDD unit 100A and the disc array storage 200 are electrically connected to each other. The HDD unit 100A is supplied with power, and records and reproduces information. The spring 141 applies a compression force to the lever 150A.

Next, a user engages his finger with the serration, lifts up the fixed member 161A in the arrow direction in FIG. 20 against the spring force of the spring 142, and moves the fixed member 161A along the attachment hole 161$a$ to the unlock position. Similar to FIGS. 8 and 9, a direction in which the fixed member 161A moves from the lock position to the unlock position is substantially orthogonal to a direction in which the HDD unit 100A is ejected from the disc array storage 200 (or the arrow direction in FIG. 21).

In the state shown in FIG. 20, the engagement members 152 and 161$c$ are disengaged from each other, and the lever 150A is unlocked from the folding state. The tab 155 is disengaged from the guide 230, and the HDD unit 100A can be ejected from the disc array storage 200. However, the engagement between the connectors 114 and 210 is still maintained in this state, and the HDD unit 100A is held in the disc array storage 200. Moreover, the elastic force by the spring 141 inclines the lever 150A in the front arrow direction, and the user easily rotates the lever 150A to the front. As a result, the spring 141 is spaced from the lever 150A. The engagement member 160A receives the reset force to the state shown in FIG. 7 due to the spring 142.

Next, the user separates his finger from the serration of the forced member 165. Then, the reset force of the spring 142 resets the fixed member 161A to the state shown in FIG. 19. While the lever 150A is moving to the unfolding position shown in FIG. 21, the connection release member 156 contacts the guide 230 of the disc array storage 200. When the user rotates the lever 150A to the unfolding position so that the rotational angle becomes 90°, the connection release member 156 presses the guide 230 and disconnects the connectors 114 and 210 from each other consequently. The contact between the bevel 158 and the engagement part 127 restricts the further rotations of the lever 150A, and the state shown in FIG. 21 becomes stable. The lever 150A's unfolding action serves to release the electric connection between the HDD unit 100A and the disc array storage 200, improving the operability. Thereby, no force holds the HDD unit 100A in the disc array storage 200, and the user can eject the HDD unit 100A from the disc array storage 200 by holding and pulling out the front plate 151a of the lever 150A in the front arrow direction.

Referring now to FIGS. 10A, 10B, 11A and 11B, a description will be given of the exemplary loading methods of the HDD unit 100 into the disc array storage 200. The disc array storage 200 is a big computer that serves as an auxiliary storage used mainly for data backup.

Figure 10A:
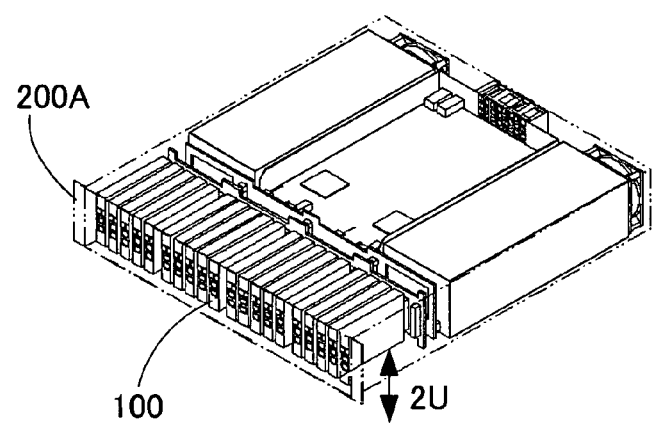
FIGS. 10A and 10B are transparent perspective overview and its exploded view that show the way of inserting the HDD unit into and ejecting the HDD unit from the disc array storage in a longitudinal direction.
Figure 10B:
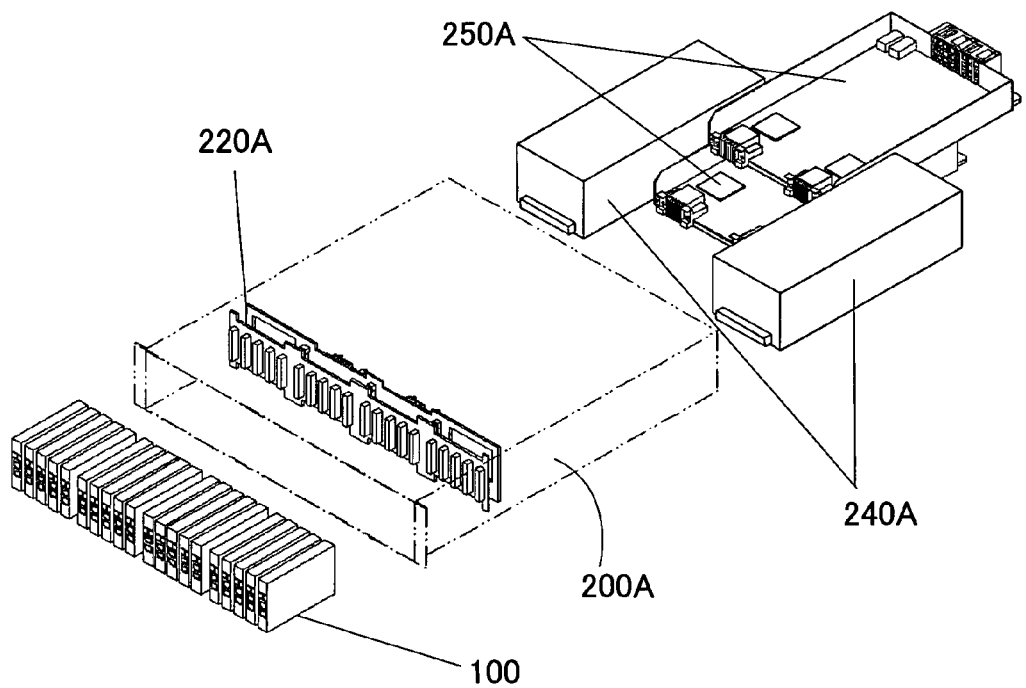

FIGS. 10A and 10B show the way of inserting the HDD unit 100 into and ejecting the HDD unit 100 from the disc array storage 200A in the longitudinal direction of the disc array storage 200A. FIG. 10A is a transparent perspective overview of the disc array storage 200A into which twenty HDD disc units 100 are loaded. FIG. 10B is an exploded view of FIG. 10A. 220A is a back panel, 240A is a power supply unit, and 250A is an interface unit. The disc array storage 200A has the height of 2U (=88.9 mm), for example.

Figure 11A:
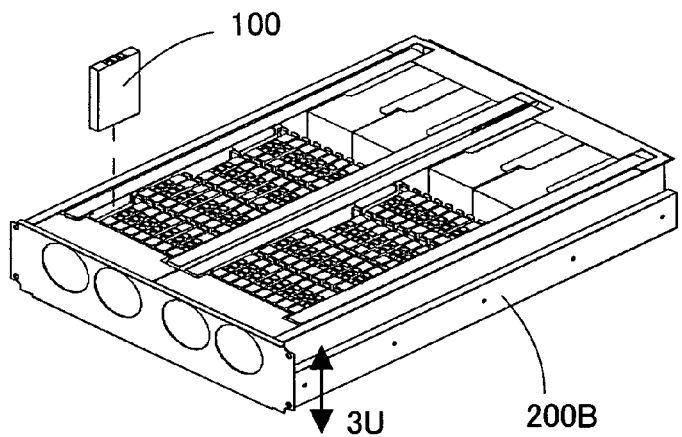
FIGS. 11A and 11B are transparent perspective overview and its exploded view that show the way of inserting the HDD unit into and ejecting the HDD unit from the disc array storage in a height direction of the disc array storage.
Figure 11B:
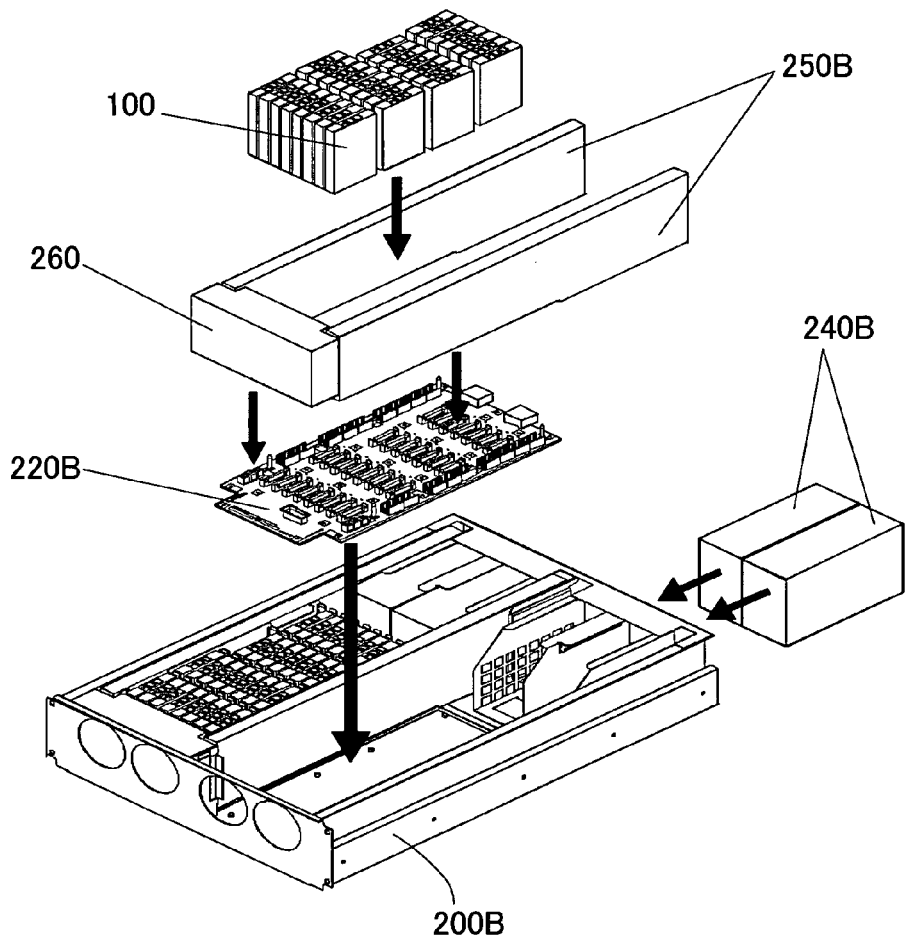
Figure 12:
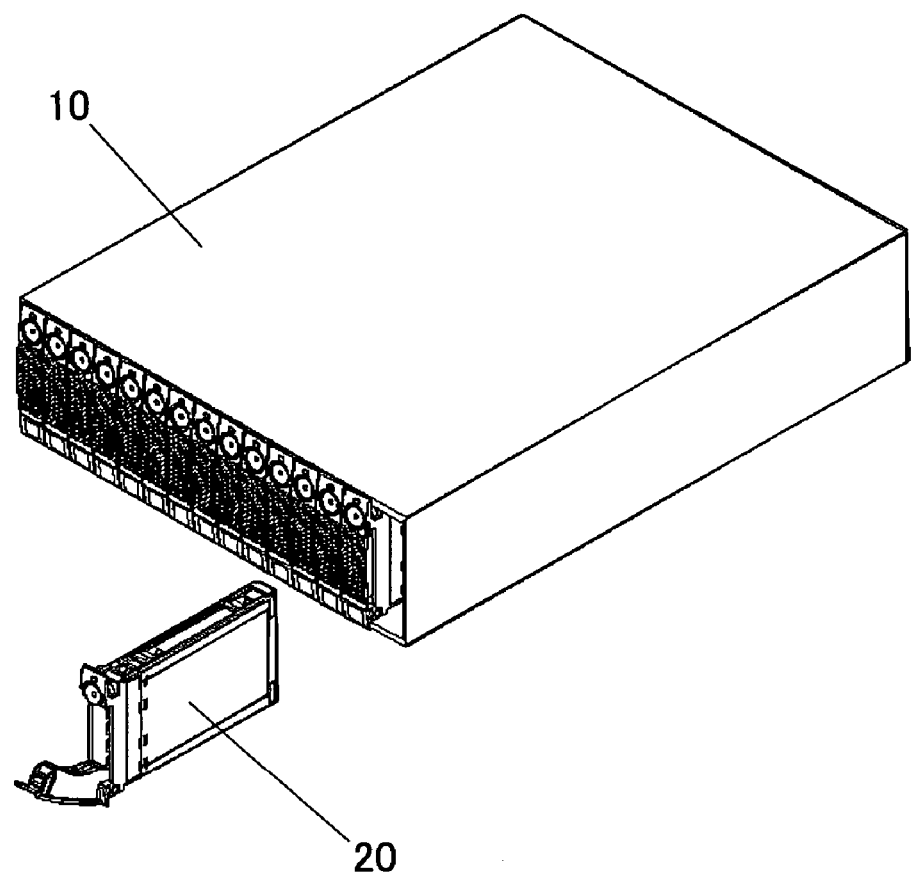
FIG. 12 is a schematic perspective view of a conventional disc array storage and HDD unit.

On the other hand, FIGS. 11A and 11B show the inserting the HDD unit 100 into and ejecting the HDD unit 100 from the disc array storage 200B in the height direction of the disc array storage 200B. FIG. 11A is a transparent perspective overview of the disc array storage 200B into which sixty HDD disc units 100 are loaded. FIG. 11B is an exploded view of FIG. 11A. 220B is a back panel, 240B is a power supply unit, 250B is an interface unit, and 260 is a cooling fan unit. The disc array storage 200B has the height of 3U (=133.35 mm), for example.

Since the length of the HDD unit 100 should match the height of the disc array storage 200B in FIG. 11, the reduced length of the HDD unit 100 is effective. The height of the disc array storage for 2.5-inch HDD unit is 3U. If the length of the 2.5-inch HDD unit is made within 3U, the loading design freedom increases without greatly changing the design of external shapes of the disc array storage 200B and the rack mount apparatus that mounts the disc array storages 200B, because the HDD unit 100 can be inserted into the disc array storage 200B in its longitudinal direction as shown in FIG. 10 or in its height direction as shown in FIG. 11.

In FIGS. 10A to 11B, the HDD unit 100 is, of course, replaceable with the HDD unit 100A. Typically, the disc array storage 200 air-cools the HDD unit 100 and the disc array storage 200. For efficient cooling or radiations, the radiation holes 123b and 123c direct to the cooling wind direction, and use of the HDD unit 100A is preferable for the disc array storage 200B. In this case, instead of the HDD unit 100A, it is conceivable to use the HDD unit 100 where the radiation holes 123b are rotated by 90°. However, the cooling wind direction is the vertical direction in FIGS. 1 and 2 in the disc array storage 200B, and the support member 162 obstructs the cooling wind and thus may hinder the efficient cooling even when the radiation holes 123b are rotated by 90°. Therefore, the use of the HDD unit 100A is preferable.

Figures 22A, 22B:
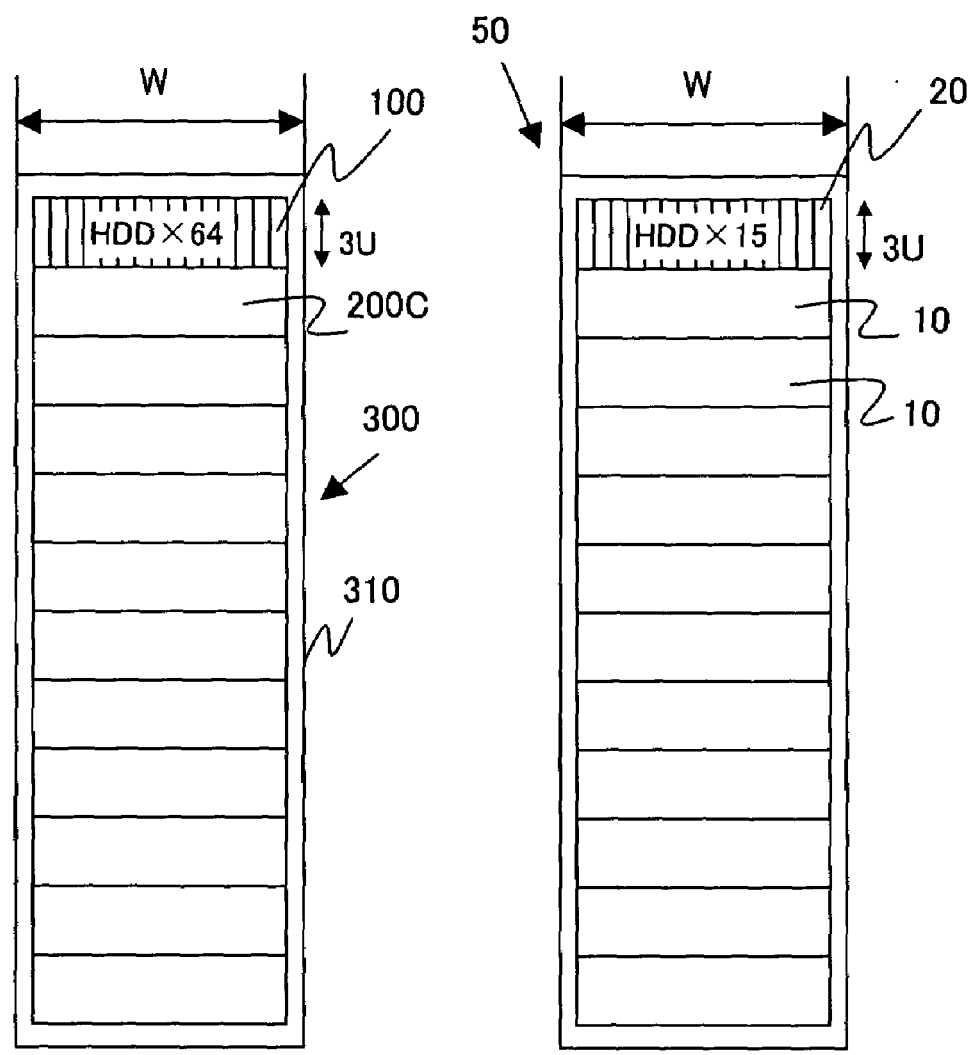
FIG. 22A is a schematic front view of a rack mount apparatus that mounts plural disc array storages as a variation of the disc array storage shown in FIGS. 11A and 11B.
FIG. 22B is a schematic front view of a conventional rack mount apparatus.

Referring now to FIGS. 22A to 28, a description will be given of a disc array storage 200C that is a more concrete structure of the disc array storage 200B shown in FIGS. 11A and 11B. Here, FIG. 22A is a schematic front view of a rack mount apparatus 300 that accommodates the plural disc array storages 200C so that each disc array storage 200C can be drawn. FIG. 22B is a schematic front view of a rack mount apparatus 50 that accommodates the plural disc array storages 10 each of which accommodates the conventional 3.5-inch HDD unit 20. The rack mount apparatuses 300 and 50 mount plural disc array storages 200C and 10, and serve as large-capacity storages. The EIA sets the width W of the rack mount apparatus 300 to the predetermined width. FIGS. 22A and 22B show a so-called 19-inch cabinet that usually has a height of about 36U.

The conventional rack mount apparatus 50 shown in FIG. 22B fixes or screws each disc array storage 10 onto the rack mount apparatus 50. As shown in FIG. 12A, the HDD unit 20 is attached to and ejected from the disc array storage 10 in the longitudinal direction of the disc array storage 10 (or the direction perpendicular to the paper surface in FIG. 22B). As shown in FIG. 22B, the disc array storage 10 can load fifteen HDD units 20 along the width W direction on its front surface, and has a height of 3U. Each 3.5-inch HDD unit 20 has a capacity of 300 GB, and thus the rack mount apparatus 50 or the disc array storage 10 has a capacity per 1U is 15×300/3=1,500 GB. On the other hand, as shown in FIG. 22B, the rack mount apparatus 50 can mount twelve disc array storages 10, and the entire capacity of the rack mount apparatus 50 is 15×300×12=54,000 GB.

Figure 23A:
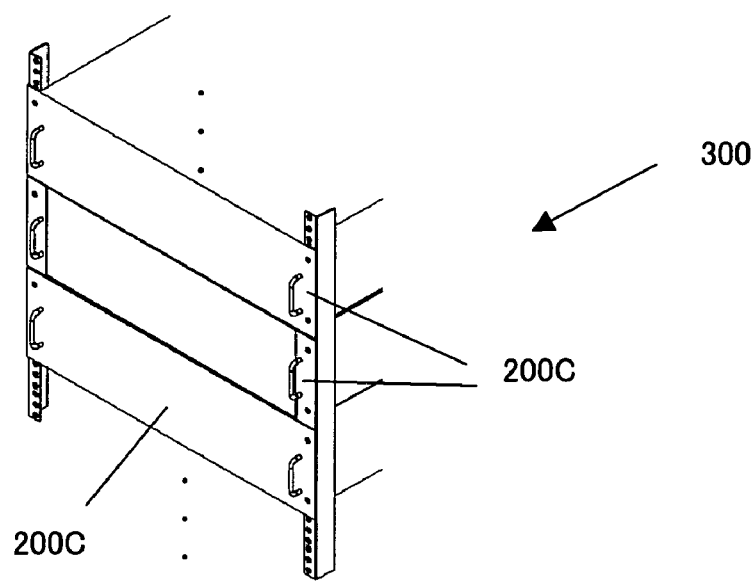
FIG. 23A is a partially enlarged perspective view of the rack mount apparatus shown in FIG. 22A.
Figure 23B:
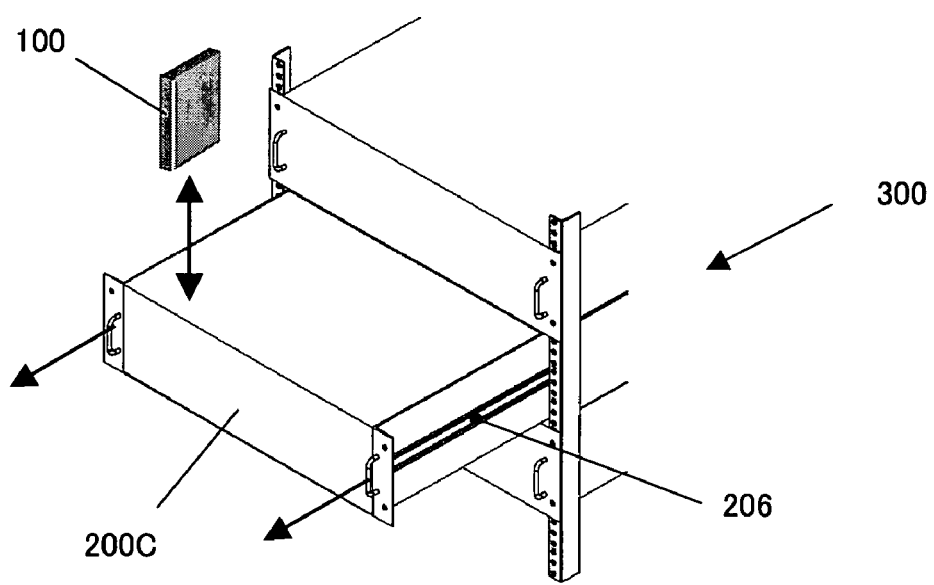
FIG. 23B is a schematic perspective view showing that one disc array storage is drawn from the rack mount apparatus shown in FIG. 23A.
Figure 24A:
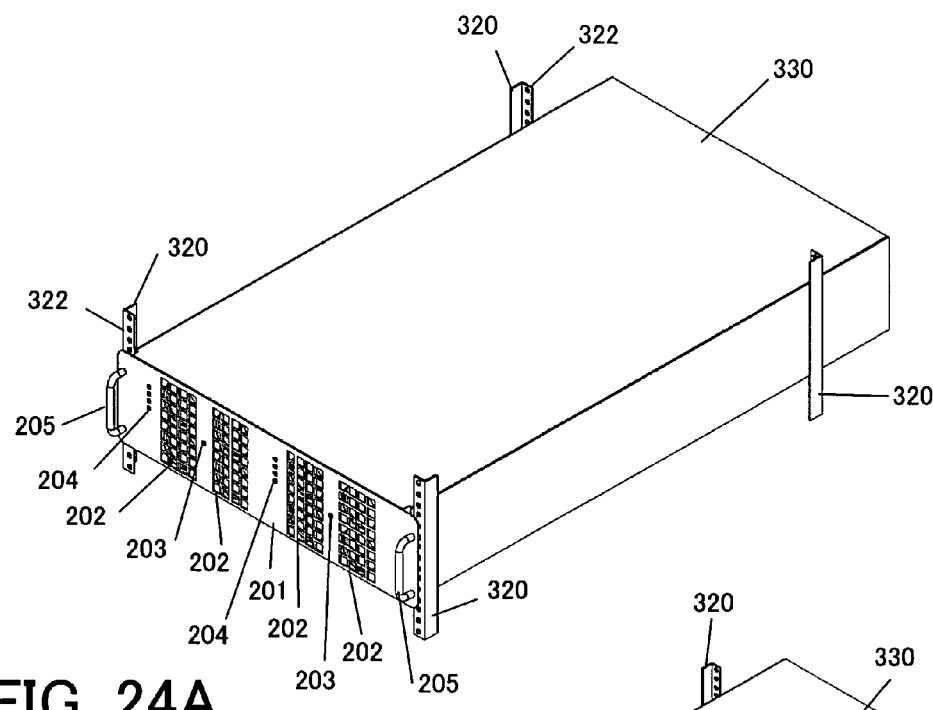
FIG. 24A is a transparent and partially enlarged perspective view of the rack mount apparatus shown in FIG. 23A around one disc array storage.
Figure 24B:
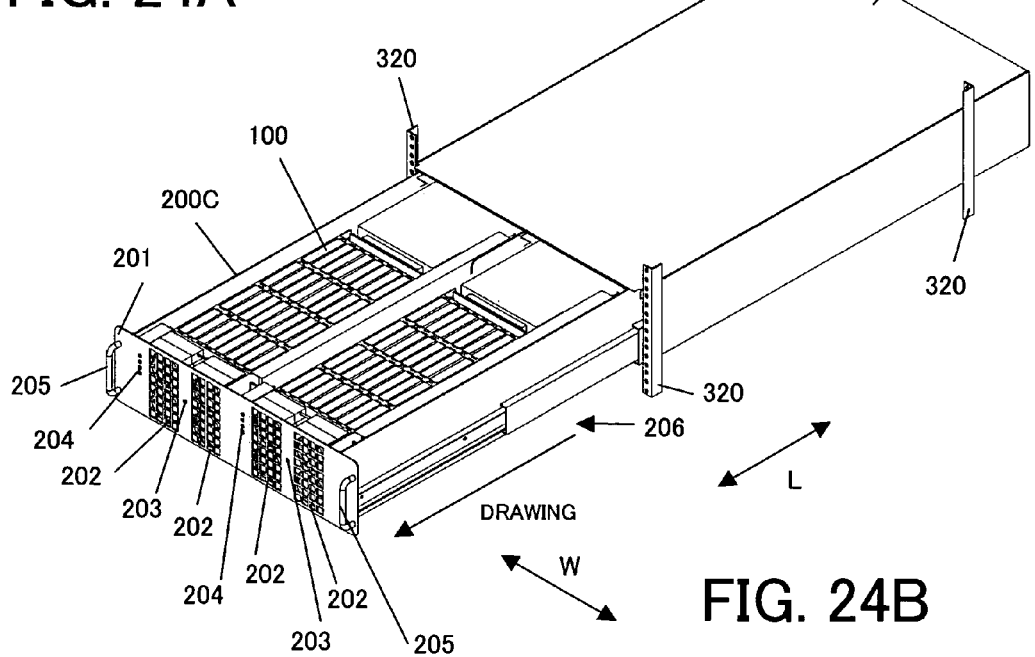
FIG. 24B is a schematic perspective view showing that one disc array storage is drawn from the rack mount apparatus shown in FIG. 24A.

The rack mount apparatus 300 shown in FIG. 22A configures each disc array storage 200C like a drawer without fixing the same. FIG. 23A is a partially enlarged perspective view of the rack mount apparatus 300 shown in FIG. 22A. FIG. 23B shows that one disc array storage 200C is drawn from the rack mount apparatus 300 shown in FIG. 22A. FIGS. 24A and 24B are schematic perspective views of one disc array storage 200C attached to the rack mount apparatus 300. FIG. 24A is a schematic perspective view showing that the disc array storage 200C is housed in the rack mount apparatus 300. FIG. 24B is a schematic perspective view showing that the disc array storage 200C is drawn from the rack mount apparatus 300.

The rack mount apparatus 300 has four support pillars 320 in a housing 310 shown in FIG. 24A, and a rectangular parallelepiped rack 330 that opens a front surface is fixed onto these four support pillars 320. Plural screw holes 322 are provided in the support pillar 320. Each rack 330 is provided with a bracket (not shown) having screw holes (not shown) at positions corresponding to the support pillars 320, and each rack 330 is fixed via screws (not shown). Although the present invention does not limit the fixing method, and any structures known in the art are available.

The disc array storage 200C closes a front surface, both side surfaces, and a bottom surface, and opens a top surface and a rear surface. The side and bottom surfaces are formed by bending one sheet of metal plate, and a front panel 201 is attached to the front surface. The front panel 201 has ventilation holes 202, perforation holes 203 and 204 for the display lamps, and a pair of grips 205 at right and left ends.

Two pairs of ventilation holes 202 are provided at the right and left sides of the disc array storage 200C of this embodiment. The ventilation holes 202 are holes for a cooling fan unit 260C, which will be described later, to absorb the open air. As described later, two cooling fan unit 260C are provided one by one to the left and right sides of the disc array storage 200C, and each cooling fan unit 260C has a pair of vertical fans 263C. Therefore, totally four ventilation holes 202 are provided. The perforation holes 203 are holes that make visible from the outside display lamps 267C, which will be described later and indicate the operational states of the cooling fan units 260C. Each cooling fan unit 260C is provided with one display lamp 267C, and two perforation holes 203 are provided one by one to the left and right sides of the disc array storage 200C.

The perforation holes 204 are holes that make visible from the outside four lamps 271C, which will be described later and indicate the operational states of the LED unit 270C. Two LED units 270 are provided one by one to the left and right sides of the disc array storage 200C, and thus two perforation holes 204 are provided one by one to the left and right sides of the disc array storage 200C.

The grips 205 are parts, which the user holds and forces so as to move the disc array storage 200C relative to the rack mount apparatus 300. A sliding mechanism 206 enables, in cooperation with the rack 330, the disc array storage 200C to move from the rack 330 in an L direction and is provided at both side surfaces. As a result, the user holds the grips 205 and can draw the disc array storage 200C from the state shown in FIG. 24A to the state shown in FIG. 24B.

As the disc array storage 200C can be drawn from the rack mount apparatus 300, plural rows (e.g., four rows in this embodiment) of HDD units 100 can be loaded onto the disc array storage 200C in the longitudinal direction L of the disc array storage 200C. The disc array storage 200C can load sixteen HDD units 100 in a width direction W (where reference numeral 100 generalizes reference numeral 100A hereinafter), and has a height of 3 U. Since each 2.5-inch HDD unit 100 has a capacity of 73 GB, the rack mount apparatus 300 or the each disc array storage 200C has a capacity per 1U of 4×16×73/3=1,557 GB. Since the rack mount apparatus 300 can load twelve disc array storages 200C, as shown in FIG. 22A, the entire capacity of the rack mount apparatus 300 is 4×16×73×12=56,064 GB. As a result, the rack mount apparatus 300 is equivalent to or superior to the conventional rack mount apparatus 50 in view of both the capacity per 1U and the entire capacity.

A structure that enables the disc array unit 200C to be drawn from the rack mount apparatus 300 facilitates ejections and insertions of the HDD unit 100, but is not necessarily a vital requirement for the increased capacity. After the HDD unit 100 is loaded onto the disc array storage 200C, the HDD unit 100 is not frequently ejected, reinserted or replaced. Thus, even when the HDD is first mounted on the disc array storage 200C and then the disc array storage 200C is screwed onto the rack mount apparatus 300, the capacity increase effect is still available (although the screws should be undone in ejecting the HDD unit 100 later).

Figure 25:
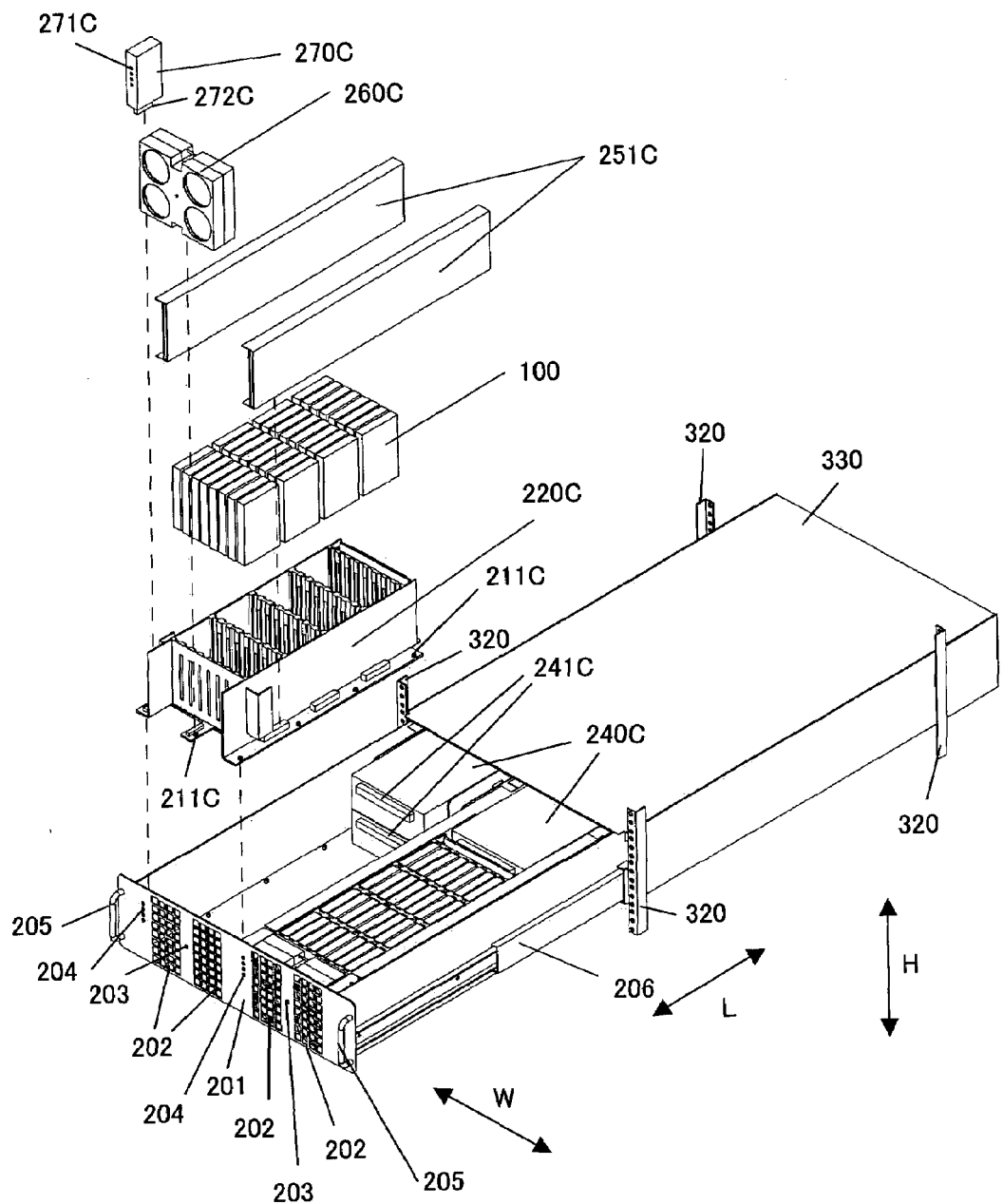
FIG. 25 is a schematic partially exploded perspective view of a front side of the disc array storage shown in FIG. 24B.

Referring now to FIGS. 25 to 32, a description will be given of a more detailed structure of the disc array storage 200C. Here, FIG. 25 is an exploded perspective view of the disc array storage 200C. The disc array storage 200C includes a back panel assembly 220C, a power supply unit 240C, an interface (I/F) unit, a cooling fan unit 260C, and an LED unit 270C.

Figure 26:
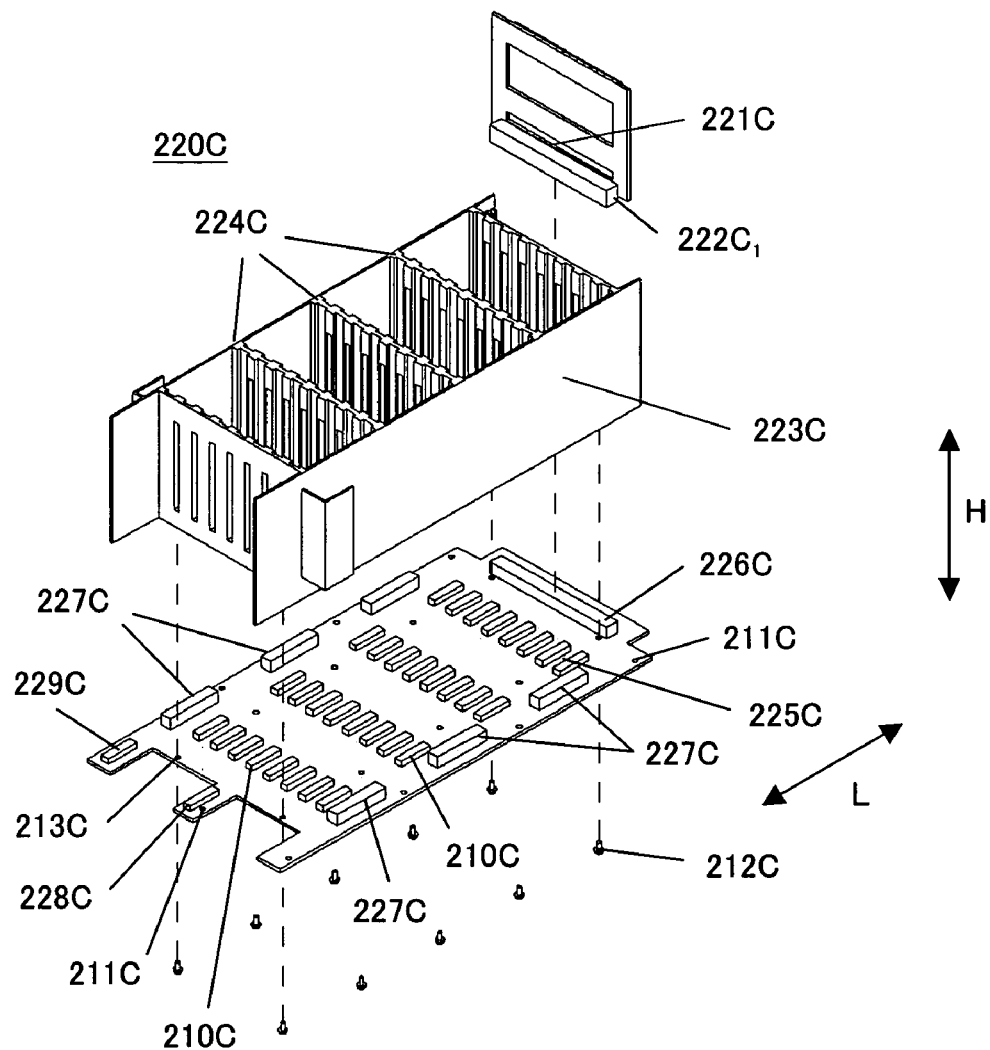
FIG. 26 is a schematic exploded perspective view of a back panel assembly shown in FIG. 25

The back panel assembly 220C is provided one by one to the right and left sides of the disc array storage 200C for accommodations and connections of plural HDD units 100 and for electric connections with the power supply unit 240C and I/F unit. The back panel assembly 220C is screwed onto the bottom plate of the disc array storage 200C. As shown in FIG. 25, the back panel assembly 220C has four screw holes 211C at each of both sides and one screw hole 211C at the center top. As shown in FIG. 26, the back panel assembly 220C includes a relay board 221C, an HDD mounting frame 223C, and a back panel 225C. Here, FIG. 26 is an exploded perspective view of the back panel assembly 220C.

Figure 31:
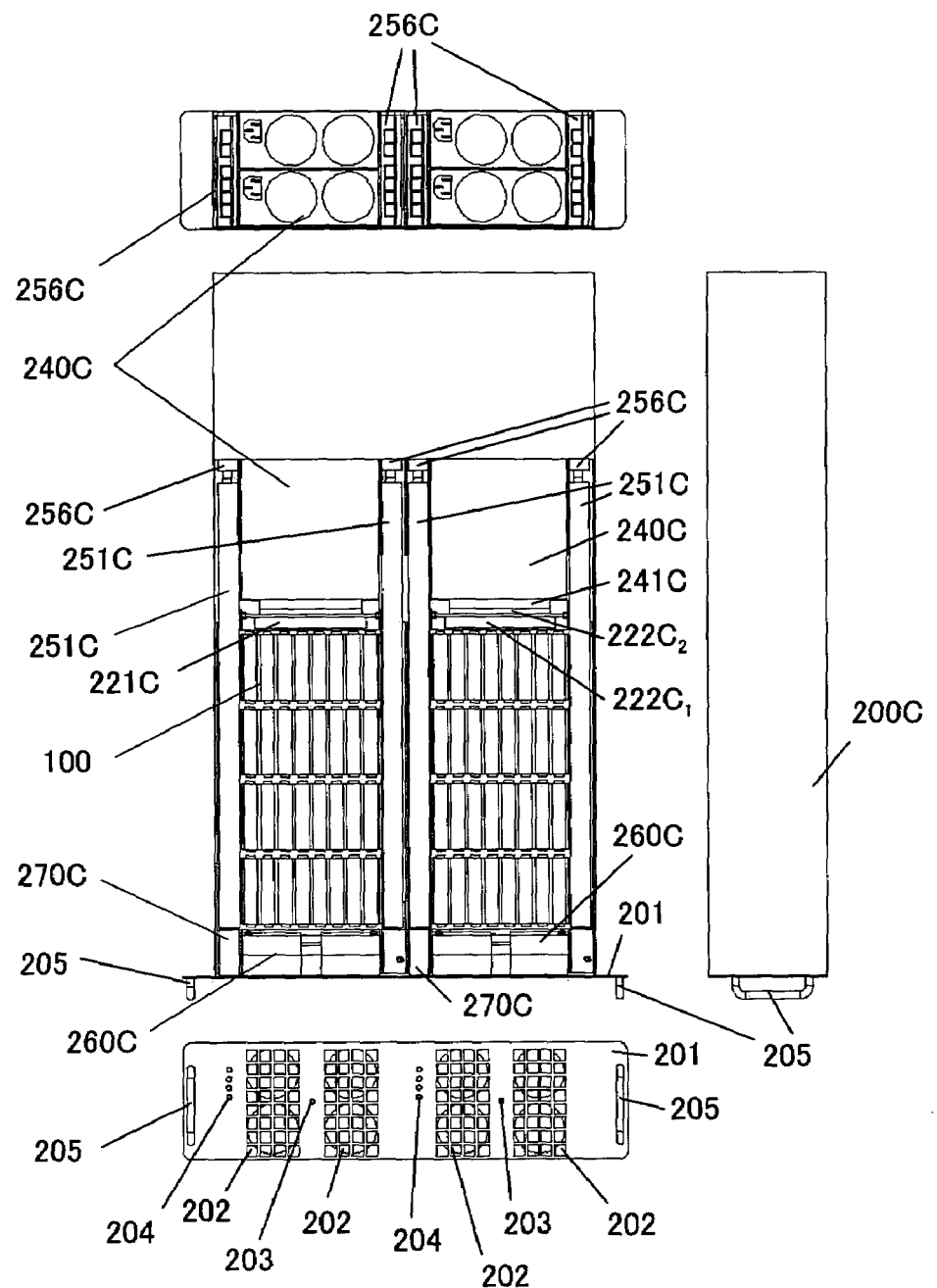
FIG. 31 shows top, front, back, and right side views of the disc array storage shown in FIG. 25.

The relay board 221C is electrically connected to the power supply unit 240C, and supplies the power to the back panel 225C and the HDD units 100 connected to the back panel 225C. The relay board 221C includes a connector $222C_1$ connected to the connector 226C of the back panel 225C, and a pair of connectors $222C_2$ connected to the power supply unit 240C. The connector $222C_1$ is connected on the back panel 225C along a height direction H of the disc array storage 200C. The connector $222C_2$ is connected to the power supply unit 240C in the longitudinal direction L perpendicular to the height direction H. The connectors $222C_2$ are not shown in FIG. 26, and shown at the center of FIG. 31. The center view in FIG. 31 is a top view of the disc array storage 20C drawn from the rack 330. An upper view in FIG. 31 is a rear view of the disc array storage 200C. The lower view in FIG. 31 is a front view of the disc array storage 200C. The right side view in FIG. 31 is a side view of the disc array storage 200C. The relay board 221C is located at the tail of the HDD mounting frame 223C.

By arranging the connecting direction between the back panel 225C and the relay board 221C (i.e., the H direction) orthogonal to the connecting direction between the relay board 221C and the power supply unit 240C (i.e., the L direction), the power supply unit 240C can be arranged adjacent to the back panel 225C along the longitudinal direction L of the disc array storage 200C. Since the EIA standard defines the width W of the disc array storage 200C, it is preferable to arrange the back panel and the power supply unit in the unrestricted longitudinal direction L.

The relay board 221C is equipped with a temperature sensor (not shown), and the temperature sensor informs the cooling fan unit 260C of temperature information detected by it via the relay board 221C and the back panel 225C.

The HDD mounting frame 223C includes plural guide plates each of which is used to house the HDD unit 100, and guide insertions and ejections of the HDD units 100. The guide plates 224C form grooves or rails that fit the external shape of the HDD unit 100 on their adjacent and opposing surfaces, and possess a convexoconcave shape. The structure facilitates ejections and insertions of the HDD units 100, and can prevent damages of the HDD units 100 mounted in the HDD mounting frame 223C due to vibrations. It is enough for the HDD mounting frame 223C to form the space for the ejections, insertions and accommodations of the HDD units 100, the HDD mounting frame 223C may have the grooves or rails as in this embodiment or may have additional partitions that connect adjacent guide plates 224C in the L direction to partition the spaces for the ejection, insertion and accommodation of the HDD units 100. The HDD mounting frame 223C is fixed onto the back panel 225C via plural screws 212C.

The back panel 225C is equipped with no control electronic components, and serves as a relay component for the relay board 221C and the I/F unit 252A. The back panel 225C is arranged perpendicular to the height direction H of the disc array storage 200C, and enables the HDD unit 100 to be loaded onto the disc array storage 200C in the height direction H. An arrangement of the back panel 225C perpendicular to the height direction H facilitates mounting of plural rows of HDD units 100.

The direction in which the HDD unit is attached to and ejected from the back panel is perpendicular to the surface of the back panel. In the conventional structure shown in FIG. 12A that attaches and ejects the HDD unit 20 in the longitudinal direction of the disc array storage, the back panel for the front row of HDD units 20 obstructs an installation of the unit in the second or subsequent rows, and makes the arrangement of plural rows of units difficult. In addition, this configuration requires plural back panels.

On the other hand, when the back panel 225C is arranged perpendicular to the eight direction H of the disc array storage 200C and the top of the disc array storage 200C is made open, the HDD units 100 in a matrix can be arranged on one back panel 225C and the number of back panels 225C reduces and the capacity increases.

The back panel 225 is electrically connected to various types of electronic components. More specifically, the back panel 225C includes thirty-two connectors 210C electrically connected to the HDD unit 100, the connector 226C electrically connected to the connector 222C of the relay board 221C, six connectors 227C connected to the I/F unit 251C, which will be described later, and a connector 228C electrically connected to the cooling fan unit 260C, and a connector 229C electrically connected to a connector 272C of the LED unit 270C. The back panel 225C is fixed onto the bottom plate of the disc array storage 200C via eight screw holes 211C at both sides and one screw hole 211C at its center top, and fixed onto the HDD mounting frame 223C via ten center screw holes 213C and screws 212C.

The number of connectors 210C corresponds to the number of HDD units 100, and is 8 rows by 4 columns in this embodiment. Each connector 210C is provided at an approximately center of each groove formed by the guide plates 224C. The connector 227C is provided three each outside both sides of the HDD mounting frame 223C as shown in FIG. 25. The back panel 225C has a three-forked structure at its front part: The connector 228C is formed at the center convex, and the connector 229C is formed at the left convex of the three-pronged fork in FIG. 26.

Figure 27:
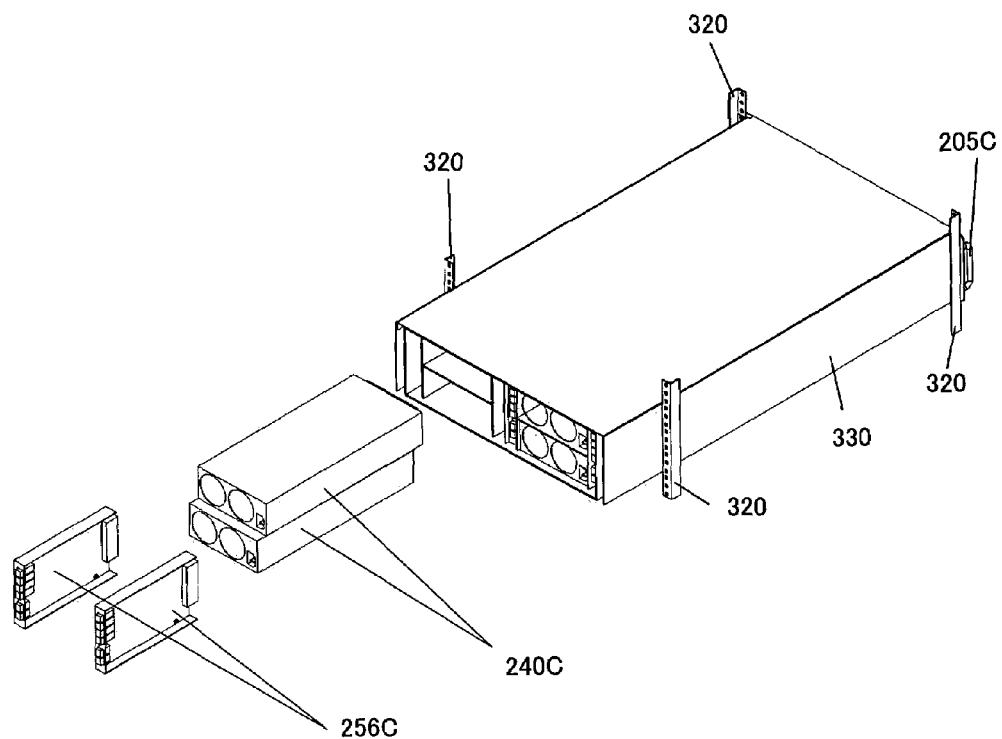
FIG. 27 is a schematic partially exploded perspective view of a backside of the disc array storage shown in FIG. 24B.

The power supply unit 240C is provided one by one to the left and right sides of the disc array storage 200C, as shown in FIG. 25. The power supply unit 240C is supplied with the power from power supply means (not shown) of the rack mount apparatus 300, and supplies the power to the back panel 225C via the relay board 221C. The power supply unit 240C has a connector 241C connected to the connector $222C_2$ of the relay board 221C, as shown in FIGS. 25 and 31's center. The power supply unit 240C is inserted into the disc array storage 200C from the backside to the front side of the disc array storage 200C (or the rack 330), as shown in FIG. 27, and connected to the relay board 221C. Here, FIG. 27 is a schematic perspective view for explaining the way of attaching the power supply unit 240C and the I/F unit 256C to the disc array storage 200C.

The I/F unit serves to transmit and receive data to be stored in the HDD units 100 and control signals for each component in the disc array storage 200C, and includes I/F units 251C and 256C. While the I/F unit should be connected to the back panel 225C, the I/F unit extends throughout the overall length of the disc array storage 200C in the longitudinal direction 1 of the disc array storage 200C. The configuration of this embodiment enables the I/F unit 251C to be attached to the back panel 225C from the top of the disc array storage 200C, and the I/F unit 256C from the backside of the disc array storage 200C to the I/F unit 251C.

Figure 28:
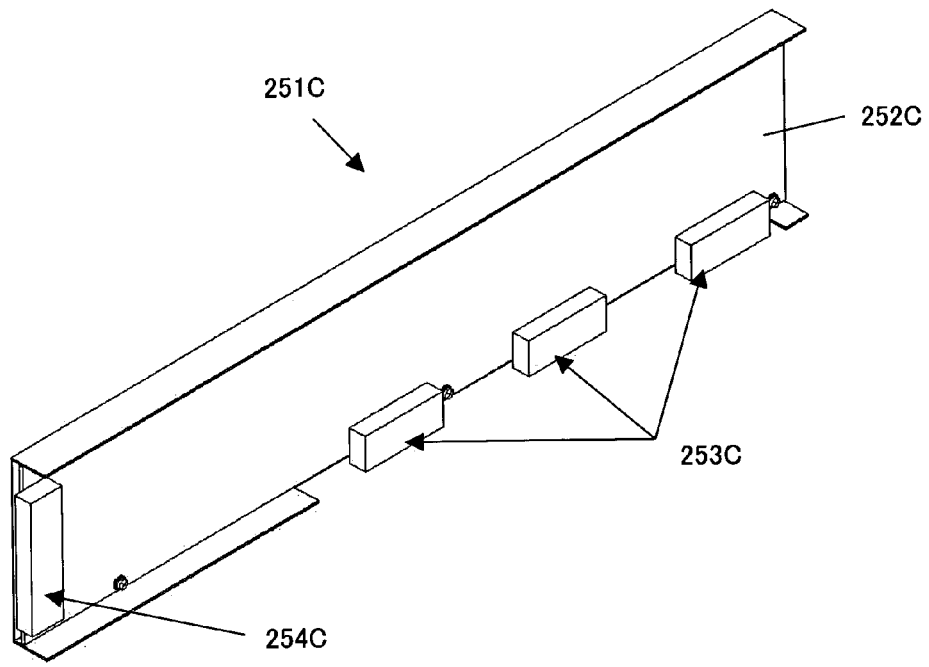
FIG. 28 is a schematic perspective view of a front-side interface unit shown in FIG. 25.

The I/F unit 251C includes, as shown in FIG. 28, a housing 252C, three connectors 253C fixed onto the housing 252 and connected to three connectors 227C of the back panel 225C, and a connector 254C fixed onto the housing 252 and connected to the I/F unit 256C. Here, FIG. 28 is a schematic perspective view of the I/F unit 251. The housing 252C may have a perforation hole for ventilation if necessity arises. The I/F unit 251C is fixed onto the back panel 225C, as shown in FIG. 25, from the top along the height direction H of the disc array storage 200C. The I/F unit 251C is provided one by one to the left and right sides of the disc array storage 200C as shown in FIGS. 25 and 31's center.

Figure 29:
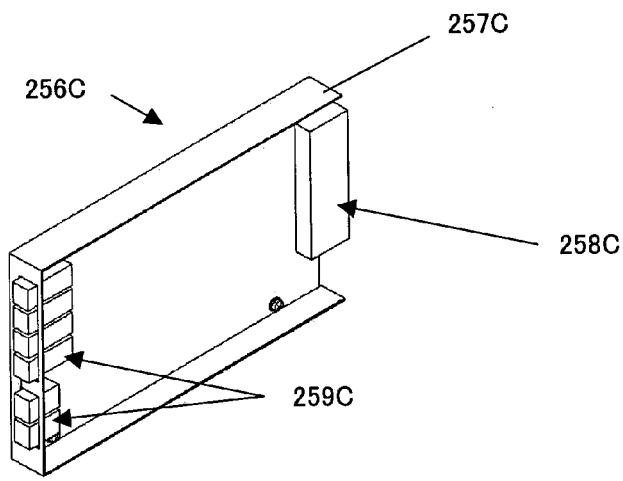
FIG. 29 is a schematic perspective view of a backside interface unit shown in FIG. 27.

On the other hand, the I/F unit 256 includes, as shown in FIG. 29, a housing 257C, a connector 258C fixed onto the housing 257C and connected to the I/F unit 251C, and a connector 259C fixed onto the housing 257C and connected to the external host. Here, FIG. 29 is a schematic perspective view of the I/F unit 256C. The housing 257 may have a perforation hole for ventilation if necessity arises. The I/F unit 256C is inserted into the disc array storage 200C from the backside to the front side of the disc array storage 200C (or the rack 330), as shown in FIG. 27, and connected to the I/F unit 251C. As shown in the top in FIG. 31, the I/F unit 256 is provided one by one to the left and right sides of the disc array storage 200C corresponding to the I/F units 251C. FIG. 25 omits the I/F unit 256C.

Figure 30A:
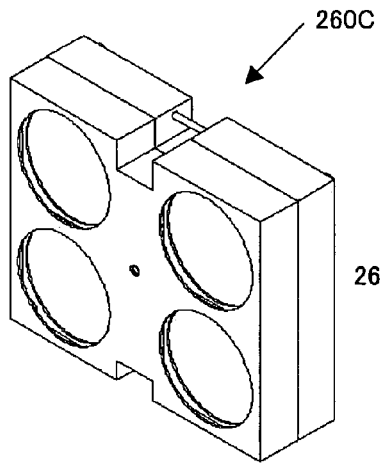
FIG. 30A is a schematic perspective view of a cooling fan unit shown in FIG. 25.
Figure 30B:
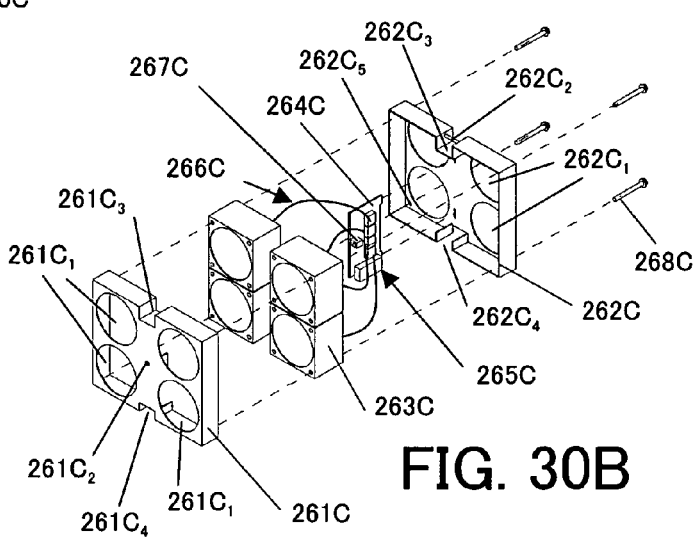
FIG. 30B is a schematic exploded perspective view of the cooling fan unit shown in FIG. 30A.
Figure 30C:
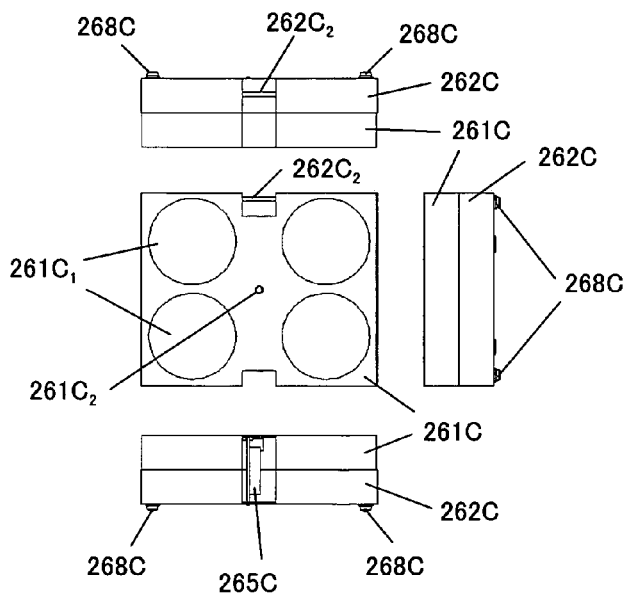
FIG. 30C shows plane and side views of the cooling fan unit shown in FIG. 30A.

The cooling fan unit 260C is connected to the ventilation holes 292, and serves to send air to and cool the HDD units 100. In this specification, "cooling" covers a concept of heat radiation. Even when the mounting density of the HDD units 100 increases, this configuration prevents thermal damages of these HDD units 100 due to their increasing heating values. The cooling fan unit 260C includes, as shown in FIGS. 30A to 30C, a front cover 261C, a back cover 262C, four fans 263C, a substrate 264C, and four screws 268C. Here, FIG. 30A is a schematic perspective view that enlarges the cooling fan unit 260C shown in FIG. 25. FIG. 30B is an exploded perspective view of the cooling fan unit 260C shown in FIG. 30A. FIG. 30C is a plane view and three views viewed from three directions of the cooling fan unit 260C.

The front and back covers 261C and 262C form an approximately rectangular parallelepiped housing. More specifically, the front cover 261C has four or 2×2 circular perforation holes $261C_1$, a perforation hole $261C_2$ provided at the center, an upper dent $261C_3$, and a lower dent $261C_4$. Each perforation hole $261C_1$ is connected to the ventilation hole 202 in the front panel 201, and exposes a corresponding one of fans 263C as shown in the bottom in FIG. 31. The perforation hole $261C_2$ is connected to the perforation hole 203 in the front panel 201, and exposes an LED 267C, which will be described later. The upper dent $261C_3$ and the lower dent $261C_4$ define the spaces for a pair of perpendicular fans 263C, preventing the lateral movements of the fans 263C or movements in the width direction W. The lower dent $261C_4$ exposes the connector 265, which will be described later, and enables the connector 265C to be connected to the connector 228C of the back panel assembly 220C. Thus, the upper dent $261C_3$ closes whereas the lower dent $261C_4$ opens.

The back cover 262C has four or 2×2 circular perforation holes $262C_1$, an identification ("ID") rod $262C_2$, an upper dent $262C_3$, a lower dent $262C_4$, and four screw holes $262C_5$. Each perforation hole $262C_1$ has the same shape as the perforation hole $261C_1$, exposes a corresponding one of fans 263C, and enables the wind from the fan 263C to be sent to the HDD units 100. The ID rod $261C_2$ crosses over the upper dent $262C_3$, and enables the user to identify the mounting orientation of the cooling fan unit 260C. The upper dent $262C_3$ has the same shape as the upper dent $261C_3$, and the lower dent $262C_4$ has the same shape as the lower dent $261C_4$. The upper dent $262C_3$ and the lower dent $262C_4$ cooperate with the upper dent $261C_3$ and the lower dent $261C_4$, and define the spaces for a pair of perpendicular fans 263C, preventing the lateral movements of the fans 263C or movements in the width direction W. The lower dent $262C_4$ exposes the connector 265, which will be described later, and enables connector 265C to be connected to the connector 228C of the back panel assembly 220C. Thus, the upper dent $262C_3$ closes whereas the lower dent $264C_4$ opens, as shown in FIG. 30B. Four screws 268C are inserted into the screw holes $262C_5$, and fix the fans 263C, which will be described later, onto the back cover 262C.

The four fans 263C attract the open air through the ventilation holes 202 in the front panel 201, as shown in FIG. 24B, and send air along the longitudinal direction L to the inner HDD units 100. A pair of vertical fans 263C are fixed to each other.

The substrate 264C controls actions of the fans 263C. The substrate 264C includes a connector 265C, plural cables 266C, and an LED 267C. The connector 265C exposes from the lower dents 261C$_4$ and 262C$_4$, and is connected to the connector 228C of the back panel 225C. The cables 266C transmit the power and control signals to the fans 263C. The LED 267C emits the light indicative of the operational states of the fans 263. The user can recognize the light through the perforation hole 203 in the front panel 201. The cooling fan unit 260C is formed as a two-speed fan in this embodiment: The fans 263C usually rotate at a low speed but are switched to a high speed when the temperature of the HDD unit 100 becomes higher than the predetermined threshold. The temperature sensor is attached to the relay board 221C as described above, but the location of the temperature sensor is not limited to this position. The temperature information is sent to (a controller in) the substrate 264C and the speed of the fan 263C is controlled based on the temperature information.

The LED unit 270C emits the light indicative of the operational state of the disc array storage 200. The LED unit 270C includes, as shown in FIG. 25, four lamps 271C, and a connector 272C. Each lamp 271C is connected to each perforation hole 204 in the front panel 201, and the user can recognize the contents of the lamps 271C. For example, a first red light turns on and informs the abnormal operation of at least one of the HDD units 100. A second blue light turns on and informs the normal operations of all the HDD units 100. A second red light turns on when the entire action of the disc array storage 200C is abnormal. A second blue light turns on when the entire action of the disc array storage 200C is normal. The connector 272C is connected to the connector 229C of the back panel 225C. If necessary, the LED unit 270C may indicate an ID number of one of the disc array storages 200C mounted in the rack mount apparatus 300.

Figure 32:
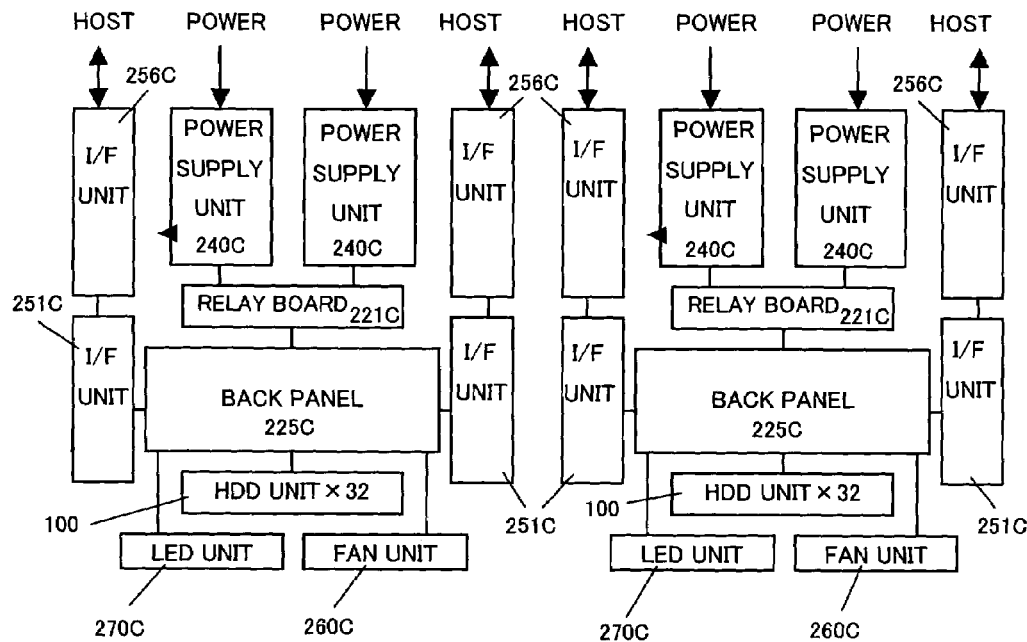
FIG. 32 is a schematic block diagram showing electric connections in the disc array storage shown in FIG. 25.

FIG. 32 is a block diagram showing electric connections of the display array storage 200C. The power is supplied from the back panel 225C via the power supply unit 240C and the relay board 221C to the I/F units 251C and 256C, the HDD units 100, the cooling fan unit 260C, and the LED unit 270C. Data to be stored in the HDD units 100 are transmitted between the external host and the HDD unit 100 via the I/F unit and the back panel 225C. The operations of HDD units 100 and the disc array storage 200 are controlled by the external host via the I/F unit and the back panel 225C.

In operation of the disc array storage 200C, the disc array storage 200C is drawn from the state shown in FIGS. 23A and 24A to the state shown in FIGS. 23B and 24B, and the HDD units 100 are attached to the back panel assembly 220C. The sliding mechanisms 206 at both sides of the disc array storage 200C facilitate smooth drawing from the rack mount apparatus 300. The power is supplied to the HDD units 100 via the power supply unit 240C, the relay board 221C and the back panel 225C. Data signals are transmitted between the HDD units 100 and the external host via the back panel 225C and the I/F unit. As described with reference to FIG. 22A, the rack mount apparatus 300 can maintain the capacity equivalent to or higher than the conventional one.

Further, the present invention is not limited to these preferred embodiments, and various variations and modifications may be made without departing from the scope of the present invention. For example, while the above embodiment discusses the unit as the HDD unit and the electronic apparatus as the disc array storage, the unit is applicable to a network unit and a disc drive in addition to the HDD and the electronic apparatus may be any rack-mount housing units.

Thus, the present invention can provide a smaller ejector that attaches the unit to and ejects the unit from the electronic apparatus, the unit having this ejector, and the electronic apparatus that removably accommodates the unit.

What is claimed is:

1. A unit, comprising:
   a unit body;
   a case that covers the unit body; and
   an ejector that attaches the unit body and the case to an electronic apparatus and ejects the unit body and the case from the electronic apparatus, wherein said ejector comprising:
   a lever that is attached foldably and unfoldably to the case, a force being applicable to said lever in attaching the unit body to the electronic apparatus and ejecting the unit body from the electronic apparatus, the lever including a first engagement part, and a tab, the tab being engaged with the electronic apparatus and fixing said unit body and the case onto the electronic apparatus when said lever is located at a folding position;
   an engagement member that is movable along a surface of the case between a lock position at which said engagement member is engaged with the first engagement part of said lever folded onto the case, and locks said lever at the folding position, and an unlock position at which said engagement member unlocks the first engagement part of said lever and allows said lever to unfold from the case; and
   an elastic member configured to apply an elastic force to said engagement member toward the lock position, the first engagement part moving with the engagement member against the elastic force of the elastic member when the lever is unfolding, and the first engagement part being restrained from unfolding by the engagement member when the lever is at the folding position, as a result of the engagement member being reset to the lock position by the elastic force of the elastic member.

2. A unit according to claim 1, wherein
   said lever is commonly fixed onto the case by a fixing member that fixes the case onto the unit body,
   said lever is configured to be foldable and unfoldable around the fixing member relative to the case,
   said engagement member includes:
   a first fixed member that is commonly fixed by the fixing member onto the case so that the fixed member can move between the lock position and the unlock position, the first fixed member including a second engagement part that is engaged with the first engagement part of said lever when the first fixed member is located at the lock position and the lever is located at the folding position, and disengaged from the first engagement part of the lever when the first fixed member is located at the unlock position;
   a second fixed member that is non-movably commonly fixed by the fixing member onto the case; and
   a forcing member that is elastically deformable, and applies a force in an unfolding direction of said lever while the forcing member is engaged with said lever, and
   a support member that serves as an elastic member connects the first and second fixed members to each other, the support member being elastically deformable so that to apply the elastic force used to reset to the lock position, when the first fixed member that has moved to the unlock position.

3. A unit according to claim 1, wherein said lever is commonly fixed onto the case by a fixing member that fixes the case onto the unit body, and said lever being configured to be foldable and unfoldable around the fixing member relative to the case.

4. A unit according to claim 1, wherein
said engagement member is commonly fixed onto the case by a fixing member that fixes the case with the unit body.

5. A unit according to claim 4, wherein
the case has first and second surfaces which are orthogonal to each other,
said engagement member has a third surface parallel to the first surface, and a fourth surface parallel to the second surface, the first and third surfaces being orthogonal to a direction in which the unit is inserted into and ejected from the electronic apparatus, and
said ejector further includes a forcing member that forces the engagement member to the lock position via the third surface, and the fourth surface is commonly fixed onto the second surface by the fixing member.

6. A unit according to claim 1, wherein the ejector further comprises a forcing member configured to apply a force smaller than the elastic force of the elastic member, to the lever in an unfolding direction of the lever.

7. A unit according to claim 1, wherein
the case has a perforation hole in a surface perpendicular to a direction in which the unit is inserted into and ejected from the electronic apparatus, and
said elastic member is fixed onto the case so that said elastic member can project from and retreat into the perforation hole.

8. A unit according to claim 1, wherein said engagement member has a serration to which the force is applied while said engagement member moves from the lock position to the unlock position.

9. A unit according to claim 1, wherein said lever further includes a connection release member engageable with the electronic apparatus, and releases an electric connection between the unit and the electronic apparatus.

10. A unit according to claim 1, wherein said ejector further includes a limiter, provided on the case, which contacts said lever and limits a further unfolding of said lever when said lever is located at an unfolded position.

11. An electronic apparatus that removably accommodates plural units according to claim 1.

12. An electronic apparatus according to claim 11, wherein each unit is removably attached to the electronic apparatus in a height direction of the electronic apparatus, said electronic apparatus comprising:
a back panel that is arranged perpendicular to the height direction, said back panel relaying power to be supplied to each unit and data to be stored in each unit; and
a mounting frame fixed to said back panel, said mounting frame guiding a connection of the unit to said back panel, and accommodating each unit connected to said back panel.

13. An electronic apparatus according to claim 11, further comprising:
a power supply unit that supplies the power;
a relay board that is mounted on said back panel in the height direction and connected to said power supply unit in a longitudinal direction of said electronic apparatus perpendicular to the height direction; and
an interface unit that is connected to said back panel and used to transmit and receive the data.

14. An electronic apparatus according to claim 12, further comprising an interface unit that is connected to said back panel and used to transmit and receive the data,
wherein said interface unit includes first and second interface units, and
wherein the first interface unit is mounted on said back panel in the height direction, and the second interface unit is connected to the first interface unit in a longitudinal direction of said electronic apparatus perpendicular to the height direction.

15. An electronic apparatus according to claim 12, further comprising a cooling fan unit that is mounted on said back panel in the height direction, is supplied with the power through said back panel, and cools the plural units through air blow.

16. An electronic apparatus according to claim 12, further comprising a display unit that is mounted on said back panel in the height direction, is supplied with the power via said back panel, and displays a state of said unit and/or said electronic apparatus.

17. An electronic apparatus according to claim 11, wherein said electronic apparatus is a rack mount apparatus that includes plural devices stacked in a height direction, and each device can accommodate plural units.

18. An electronic apparatus according to claim 17, further comprising a housing, and a sliding mechanism configured to draw each device from the housing.

* * * * *

UNITED STATES PATENT AND TRADEMARK OFFICE
CERTIFICATE OF CORRECTION

PATENT NO.         : 7,558,058 B2
APPLICATION NO.    : 11/193464
DATED              : July 7, 2009
INVENTOR(S)        : Hiroshi Hidaka It is certified that error appears in the above-identified patent and that said Letters Patent is hereby corrected as shown below:

Title Page, Column 2 (Abstract), Line 8, after "member" delete "is engaged with".

Signed and Sealed this

Third Day of November, 2009

David J. Kappos
*Director of the United States Patent and Trademark Office*